(12) United States Patent
Draht et al.

(10) Patent No.: US 8,141,761 B2
(45) Date of Patent: Mar. 27, 2012

(54) SETTING DEVICE, METHOD AND APPARATUSES FOR FEEDING FASTENING ELEMENTS

(75) Inventors: Torsten Draht, Schloss Holte (DE); Bernd Haesler, Halle/Westfalen (DE); Hans-Jorg Lang, Stauchdach (DE); Iris Spiller-Bohnenkamp, Bielefeld (DE)

(73) Assignee: Bollhoff Verbindungstechnik GmbH (DE)

( * ) Notice: Subject to any disclaimer, the term of this patent is extended or adjusted under 35 U.S.C. 154(b) by 173 days.

(21) Appl. No.: 12/595,860

(22) PCT Filed: Apr. 11, 2008

(86) PCT No.: PCT/EP2008/002924
§ 371 (c)(1),
(2), (4) Date: Oct. 23, 2009

(87) PCT Pub. No.: WO2008/125311
PCT Pub. Date: Oct. 23, 2008

(65) Prior Publication Data
US 2010/0163595 A1 Jul. 1, 2010

(30) Foreign Application Priority Data
Apr. 14, 2007 (DE) .......................... 10 2007 017 689

(51) Int. Cl.
*B25C 5/06* (2006.01)
(52) U.S. Cl. ............ 227/136; 227/119; 227/149; 173/1; 29/759; 29/760; 29/761; 29/809; 221/1; 221/13; 221/277

(58) Field of Classification Search ...... 173/1; 227/136, 227/119, 149; 29/809, 759–761; 221/1, 221/13, 277
See application file for complete search history.

(56) References Cited

U.S. PATENT DOCUMENTS

| | | | |
|---|---|---|---|
| 2,680,246 A | | 5/1950 | Rambo |
| 2,612,281 A | * | 9/1952 | Erhardt, Jr. .................... 227/141 |
| 2,869,129 A | * | 1/1959 | Rogers, Jr. ...................... 227/90 |
| 2,879,509 A | | 3/1959 | Congdon et al. |
| 2,890,913 A | | 6/1959 | Miskel et al. |
| 2,901,749 A | | 9/1959 | Crossen et al. |
| 3,049,713 A | | 8/1962 | Dupuy et al. |
| 3,597,826 A | * | 8/1971 | Shields ........................... 29/777 |
| 3,743,158 A | | 7/1973 | Cohn et al. |
| 3,915,367 A | * | 10/1975 | Potucek ........................ 227/136 |
| 3,982,679 A | | 9/1976 | White, Jr. |
| 4,015,746 A | | 4/1977 | Thomas |
| 4,099,324 A | | 7/1978 | Johnson et al. |
| 5,004,141 A | | 4/1991 | Young et al. |
| 6,027,004 A | * | 2/2000 | Ramella et al. ............... 227/136 |
| 6,779,697 B2 | | 8/2004 | Lin |

(Continued)

FOREIGN PATENT DOCUMENTS
AU 622995 4/1992
(Continued)

*Primary Examiner* — Rinaldi I. Rada
*Assistant Examiner* — Michelle Lopez
(74) *Attorney, Agent, or Firm* — Seyfarth Shaw LLP

(57) ABSTRACT

The present invention discloses a feed apparatus, a feed channel and a setting device, that is used in connection with these specific apparatuses. The feed apparatus uses either a strip magazine or a rotary magazine. The feeding of the fastening elements proceeds stepwise using a movable slide, where with use of the rotary magazine a simultaneous loading and unloading of the rotary magazine at different positions is guaranteed.

22 Claims, 20 Drawing Sheets

U.S. PATENT DOCUMENTS

Figure 1:
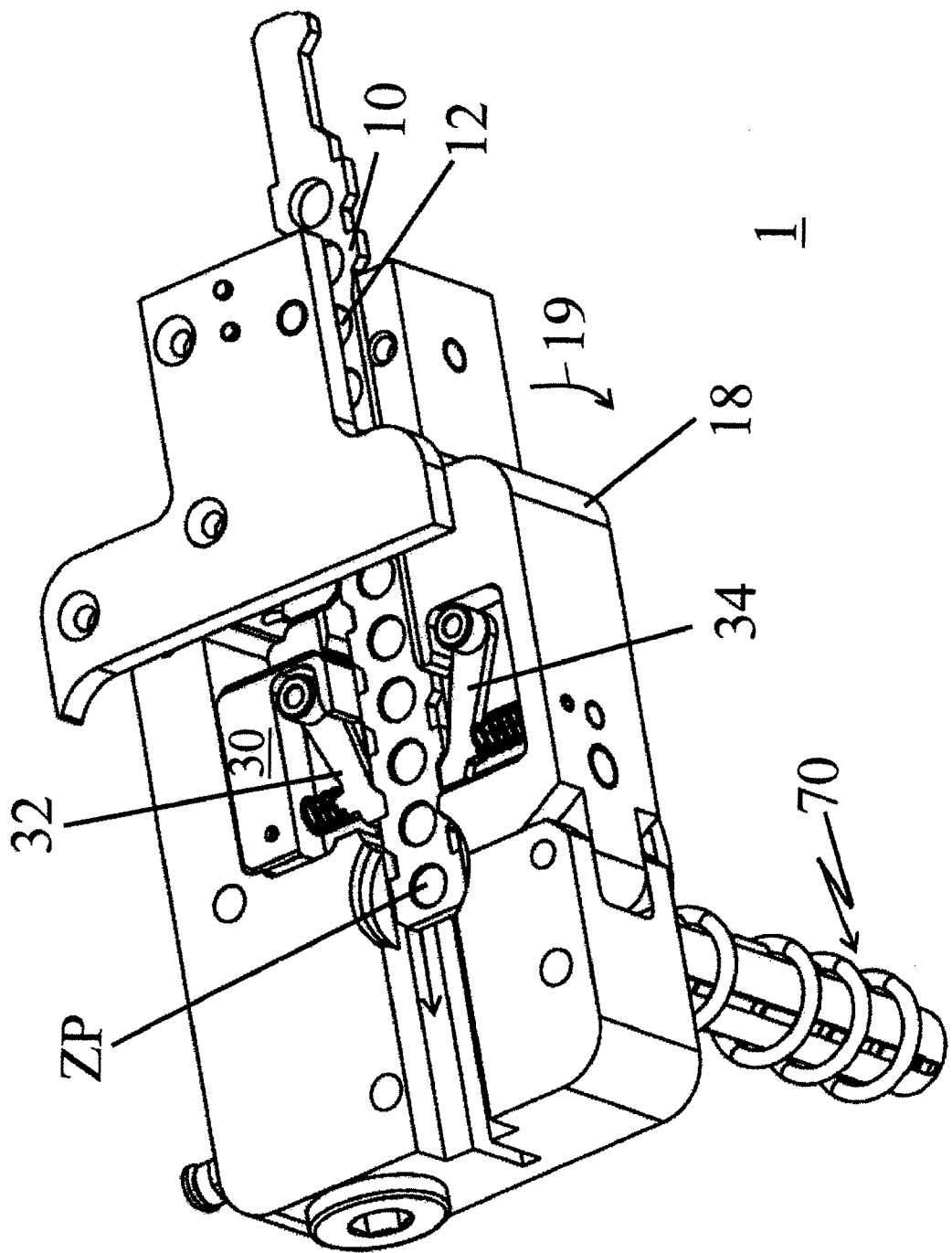

| | | |
|---|---|---|
| 2006/0000073 A1 | 1/2006 | Daniels et al. |
| 2007/0017953 A1 | 1/2007 | Hamar |

FOREIGN PATENT DOCUMENTS

| | | |
|---|---|---|
| CA | 2 273 711 A1 | 3/2000 |
| DE | 63363 | 9/1891 |
| DE | 1 703 106 | 1/1972 |
| DE | 2 248 956 | 4/1973 |
| DE | 26 23 206 | 12/1977 |
| DE | 44 05 661 A1 | 8/1995 |
| DE | 197 40 070 A1 | 3/1999 |
| DE | 695 12 018 T2 | 5/2000 |
| DE | 20 2006 016 504 U1 | 2/2007 |
| EP | 0 068 857 A1 | 5/1983 |
| EP | 0 526 138 A2 | 2/1993 |
| EP | 0 567 240 A1 | 10/1993 |
| EP | 0 835 726 A1 | 4/1998 |
| EP | 0 987 086 A2 | 3/2000 |
| EP | 1 369 214 A2 | 6/2003 |
| EP | 1 741 519 A1 | 1/2007 |
| GB | 647987 | 12/1950 |
| GB | 2 003 074 A | 3/1979 |

\* cited by examiner

SETTING DEVICE, METHOD AND APPARATUSES FOR FEEDING FASTENING ELEMENTS

1. FIELD OF THE INVENTION

The present invention relates to a feed apparatus for feeding fastening elements within a setting device, a feed channel for feeding fastening elements to a join location, and a setting device in conjunction with these components for joining fastening elements, especially, for setting of bolts, rivets, punch rivets and nails.

2. BACKGROUND OF THE INVENTION

Various constructions of setting devices are known in the state of the art. These devices serve for joining rivets, bolts or other elements, which are collectively called fastening elements. Depending on the construction and field of application, the setting devices function with differing feed apparatuses for the respective fastening elements. An example of such a setting device is described in the patent DE 20 2006 016 504. Using this apparatus, for example, bolts are driven into a work piece at high frequency.

In the state of the art, the feeding of fastening elements to the respective setting device is implemented in differing ways. According to one alternative, the fastening elements are pushed by the force of a spring from a magazine into the feed channel or into the proximity of the feed channel of the setting device. From there, the joining process of the fastening element takes place using the punch of the setting device. It is also known to feed the fastening elements using a carrier strip. On such carrier strips the fastening elements are held sequentially at uniformly spaced retaining positions. Within the setting device, the fastening elements are removed from the retaining position in order to be fed to the punch for joining.

A drawback with the feed apparatuses and feed methods known from the state of the art is that the fastening elements can frequently not be fed with the required positional accuracy or the desired frequency. It is also disadvantageous to use rondels for supporting the positioning of the fastening elements, because these cause additional manufacturing expenditure and therefore cost. Thus, in general, different aspects hamper the course of the joining procedure, which leads to a loss of time and additional costs.

Therefore, it is the object of the present invention to provide a feed apparatus, a feed channel, a setting device with these components, and a method for feeding fastening elements, with which the disadvantages of the state of the art are overcome.

3. SUMMARY OF THE INVENTION

The object above is achieved by a feed apparatus, by a feed channel, by a loading apparatus, by a roller presser for a setting device, by a setting device, by a method for feeding fastening elements, and a method for joining fastening elements. Advantageous designs and further developments of the present invention are described from the following description, the accompanying drawings and claims.

The feed apparatus according to the invention, with which fastening elements especially rivets, bolts, nails, held in a carrier, can be fed to a setting device, wherein the carrier has uniformly spaced retaining positions of the fastening elements, comprises the following features: a slide, which is movable into an advance position and a home or base position, an advance arm, whose first end is fastened pivotably at the slide and whose second end engages at the carrier so that the movement of the slide can be transferred to the carrier, whereby a fastening element can be positioned into a feed position beneath a punch of the setting tool.

Within the feed apparatus, a carrier with fastening elements is moved onward stepwise by a preferably linear movement of the slide. The step size of this movement comprises, in each case, the distance between two adjacent retaining positions of fastening elements. In this way, with each step a new fastening element is fed to a feed position beneath the punch. The linear movement of the slide is transferred to the carrier using the advance arm. The advance arm engages laterally at the carrier so that the carrier can be moved onward due to a positive locking connection, at least in one direction of movement, between the slide and the carrier. As soon as the fastening element has attained the feed position through the movement of the slide, there exists on one hand the possibility that the punch moving in the direction of the join location separates the fastening element from the carrier. Furthermore, there is the possibility that the fastening element is separated from the carrier at the feed position due to gravity, compressed air or other effects, and is released into the feed channel of the setting device. A feed apparatus constructed in this manner enables the feed of fastening elements at high frequency, while the fastening elements can be subsequently resupplied without a problem with the carrier that is used.

According to one preferred design of the feed apparatus, the slide is linearly movable using a pneumatically operated piston cylinder drive. According to a further alternative, the pneumatically operated piston cylinder drive is synchronized in order to be able to optimally adjust the drive to the joining movements of the punch, or in general, of the setting device. In addition, this drive can be operated independently of the movement of the punch of the setting device. A further alternative consists in operating the pneumatic piston cylinder drive using the return air of a likewise pneumatically operated punch of a setting device. However, in this context, other adjusting elements, such as electromagnetic, piezoceramic or purely mechanical drives can also be used for the slide.

In order to attain the controlled advance of the carrier, the slide of the feed apparatus in the advance position is biased in the direction of the home position using a spring, so that using the spring preload the slide can be moved into the home position, and the carrier can be shifted by one retaining position using the movement of the slide. This implies that due to the movement of the slide, implemented through the spring preload, from the advance position into the home or base position, the carrier is moved onward by one retaining position with the fastening element. Thereby after a joining process, the feed of the next fastening element within the carrier to the joining position of the setting device is guaranteed.

According to a further embodiment it is preferred to provide a blocking means that engages at the carrier such that a movement of the carrier is prevented during the movement of the slide from the home position into the advance position. This blocking means is implemented, for example, through a blocking arm pivotably fastened to the housing. Another alternative consists in that during the joining the punch of the setting device extending through an opening located in the carrier forms the blocking means for the carrier during the movement of the slide. According to a further embodiment, the carrier that is used is equipped with a friction brake so that during the advance of the carrier, it is not unduly accelerated. A spring, for example, acts as a friction brake, by pressing the carrier against the housing of the setting device. Thereby, due to friction between the carrier and the housing, the movement of the carrier is only decelerated or impeded to the extent that the carrier moves adapted to its feed function of the fastening elements. Such a friction brake, for example, counteracts the inertia of the carrier, in order to dampen an excessive acceleration of the carrier during an advance movement.

According to different alternatives of the present invention, the carrier of the feed apparatus is built by a strip magazine with successively disposed retaining positions, or by a ring-shaped rotary magazine with retaining positions disposed in the circumferential direction of the rotary magazine. The strip magazine has on at least one longitudinal side, and the rotary magazine has on a circumferential outer surface, a barb-like structure so that with the above named advance arm of the slide, the strip magazine and also the rotary magazine can be moved in each case stepwise in only one direction.

Whereas the retaining positions in the strip magazine are formed by openings, in which at least a part of the fastening element is held, the rotary magazine includes at the retaining positions, in each case, a chamber in which, in each case, a fastening element can be held in the correct positional orientation. In order to close these chambers of the rotary magazine at the retaining positions towards the bottom, the rotary magazine is disposed on a plate, while at least one feed position the plate has an opening through which the fastening elements can be released from the chamber. Because this opening or the feed position is preferably arranged directly above the feed channel of the setting device, the respective fastening element falls directly out of the rotary magazine into the feed channel, or is pressed by compressed air, an impulse, or an effect in a directed action out of the rotary magazine into the feed channel of the setting device. Therefore the possibility also exists that the punch of the setting device can be moved through the opening in the plate at the feed position in order to first move the fastening element out of the chamber into the feed channel, and subsequently to join it. Thus, due to the rotation of the rotary magazine and the positioning of a chamber at the feed position, the chamber is a component part or extension of the feed channel, i.e., the chamber is coaxially aligned with the feed channel.

Furthermore, the rotary magazine is preferably covered by a cover plate so that the chambers are closed by the plate on the upper side of the rotary magazine. This cover plate has an opening at least at one loading position through which the fastening elements can be fed into the chamber, and thus into the rotary magazine. Because the feed position and loading position are disposed at different locations with respect to the periphery of the rotary magazine, that is, the opening in the cover plate and the opening in the plate beneath the rotary magazine are not aligned above each other, a fastening element can be fed into a joining process and a new fastening element can be loaded into a chamber of the rotary magazine at the same time. This design provides the possibility for further time savings with respect to the joining and further feeding of fastening elements to a setting device with the proposed feed apparatus.

The present invention also discloses a feed channel for a setting device through which fastening elements, especially rivets, bolts, nails can be fed to a join location, and which has the following features: a hollow cylindrical channel with slots running in the longitudinal direction of the channel, while bars projecting radially through the slots in the channel are movably disposed.

The axially running bars project into the hollow cylindrical feed channel, and in this way, restrict its cross section. The constriction is adapted to the cross section of a fastening element to be joined, so that the bars create a smaller cross section in the feed channel than the cross section of the fastening element. In this way, the fastening element is decelerated by these bars as soon as it is clamped between these bars. In order to be able to generate an adjustable clamping force of the bars, acting radially inwards, the bars are biased using a spring. This can be, for example, a spiral spring which also extends in an axial direction, and which presses the bars into the hollow cylindrical channel. It is also conceivable to use individual spring elements or spring rings which are disposed axially distanced from each other along the hollow cylindrical channel. Due to the arrangement of the bars tapering the hollow cylindrical channel, the fastening element, on the one hand, is decelerated, and on the other hand is oriented in the axial direction of the feed channel. Additionally, the decelerating guarantees that the punch of the setting device again reaches a fastening element that has advanced during the joining process such that due to the contact of the punch with the fastening element, in particular, the parallel contact of the adjacent faces of the bolt and punch, an alignment of the fastening element occurs in the feed channel.

The present invention also discloses a further alternative of a feed channel for a setting device through which fastening elements, especially rivets, bolts, nails can be fed to a join location, and which has the following features: a hollow cylindrical channel with an interior and exterior, whose interior consists of a plurality of brake shoes for the tapering of the feed channel over a specific length, wherein the brake shoes are pretensioned in the radial direction of the feed channel in order to bring the fastening element during its movement through the feed channel in contact with the brake shoes. These brake shoes are preferably disposed concentrically about the center of the hollow cylindrical channel, and each has the same length. In addition, they are biased with springs in the direction of the center of the hollow cylindrical channel.

The design of the feed channel with brake shoes fulfills the same functions as the feed channel described above with bars projecting radially into the channel. The brake shoes project into the hollow cylindrical channel and thereby reduce the inner diameter of the hollow cylindrical channel in the area of the brake shoes. Because the brake shoes are spring biased in the direction of the center of the hollow cylindrical channel, the diameter of the hollow cylindrical channel can be enlarged in this area by an incoming fastening element, in that the fastening element presses the brake shoes away from the center of the hollow cylindrical channel in the radial direction, counter to the spring biasing. With this arrangement, decelerating and preferably retaining and positioning of a fastening element in the feed channel can be implemented.

The present invention also discloses a feed channel for a setting device through which fastening elements, especially rivets, bolts, nails can be fed to a join location, and which has the following features: a hollow cylindrical channel with an interior and an exterior and a first and second end, while the fastening element during a setting process exits at the second end of the hollow cylindrical channel, a compressed air connector near the second end of the hollow cylindrical channel, through which compressed air can be blown into the hollow cylindrical channel preferably in the direction of the first end of the hollow cylindrical channel, so that the fastening element can be decelerated by means of the blown in compressed air.

The feed channel described here implements a braking path using blown in compressed air which counteracts a movement of the fastening element in the hollow cylindrical channel. Before the setting process of the fastening element using the punch begins, the fastening element must move into the feed channel against the counter pressure of the blown in compressed air. The pressure of the blown in compressed air, preferably 1 to 6 bar, can be varied in such a way that the fastening element is decelerated or stopped during its movement through the hollow cylindrical channel. In addition, the blown in compressed air acts on the entire fastening element moving in the hollow cylindrical channel such that the fastening element is also aligned within the hollow cylindrical channel.

The compressed air is blown into the hollow cylindrical channel using compressed air channels, preferably two to four compressed air channels, while the compressed air channel runs in radial direction from the outside to the inside and is inclined in the direction of the first end of the hollow cylindrical channel. Additionally, it is preferred to connect the compressed air channel directly to the compressed air source, or to dispose coaxially around the hollow cylindrical channel a compressed air reservoir with a connection to a compressed air source that supplies the compressed air channel with air.

The present invention also discloses a feed channel for a setting device through which fastening elements, especially rivets, bolts, nails can be fed to a join location, and which has the following features: a hollow cylindrical channel with an inside and an outside as well as a first and second end, while during the setting process the fastening element exits the hollow cylindrical channel out of the second end, at least one compressed air channel which runs in the radial direction from the exterior to the interior and in proximity of the second end of the hollow cylindrical channel, while the at least one compressed air channel includes a throttle using which an air ram pressure between the fastening element and the second end of the hollow cylindrical channel can be released starting from an adjustable pressure value in the hollow cylindrical channel.

The feed channel according to the invention works also with counter direction air, which counteracts the fastening element moving in the feed channel. However, this counter direction air is not blown into the feed channel via the additional compressed air lines. Rather, the ram pressure building up in the hollow cylindrical channel is used for decelerating the fastening element. Because the second end of the hollow cylindrical channel rests upon the component to be joined and thereby is nearly closed, and the fastening element nearly closes the channel due to the small tolerances to the inner diameter of the hollow cylindrical channel, a ram pressure develops in front of the fastening element in the direction of its movement, while the fastening element is moving through the hollow cylindrical channel in the direction of the component. The farther the fastening element moves in the direction towards the component, the more the air between the fastening element and the component is compressed, such that the ram pressure increases in front of the fastening element. If this ram pressure is sufficiently high, the fastening element is decelerated due to this, or even brought to a complete stop. In order to control the decelerating of the fastening element, and in order to enable a setting of the fastening element, the ram pressure can be discharged via a throttle or regulating valve disposed in the proximity of the second end of the hollow cylindrical channel. In this way, the ram pressure does not negatively affect the setting process of the fastening element.

Further, the present invention discloses a loading apparatus in combination with a carrier, in particular, a rotary magazine, using which at least one fastening element, preferably rivets, bolts, nails can be individually loaded into the carrier, and which has the following features: a supply channel, via which at least one, or a plurality of fastening elements can be supplied to the loading apparatus, a separating arrangement with which at least one fastening element can be transferred or with which at least one fastening element can be separated from the plurality of fastening elements, such that it can be transferred individually into the carrier, and a transfer arrangement which transfers the at least one fastening element individually to the carrier so that one of its retaining positions is loaded with the fastening element.

The function of the loading apparatus is to load the carrier of the supply apparatus, preferably continually, with new fastening elements. According to a preferred embodiment, the loading apparatus is used in combination with the rotary magazine, already described above. Within the supply channel which is formed, for example by a flexible tube, the fastening elements lie touching each other so that they are supplied axially aligned one after the other to the setting device. According to a further embodiment, the fastening elements are not disposed in a series in the supply channel, but rather are supplied individually, for example, through the flexible tube to the loading apparatus. The cross section of the supply channel is selected to be of a size so that the fastening elements are aligned coaxially to the longitudinal axis of the supply channel. While the fastening elements arranged one after the other in the supply channel are ready to be loaded, the separating arrangement transfers the fastening element in the first position, in each case, from the plurality of the fastening elements in the supply channel, in order to prepare it for loading into the carrier. Using the transfer arrangement, this separated fastening element is then transferred to the carrier or rotary magazine.

According to an embodiment, the separating arrangement comprises a channel that runs in a curvilinear manner, in which the at least one fastening element can be transported oriented in the longitudinal direction of the curvilinear progressing channel. This curvilinear progressing channel has at its end facing the carrier preferably a brake shoe arrangement with which the fastening element can be stopped. While the fastening elements can be supplied via the curvilinear progressing channel with any arbitrary speed, first, the fastening element located at the foremost position is stopped in the braking arrangement for preparing a separation. This brake shoe arrangement is preferably composed of a plurality of brake shoes disposed resiliently in a radial direction relative to the curvilinear progressing channel. This brake shoe arrangement reduces the cross section of the curvilinear progressing channel at its end facing the carrier to an extent that the channel cross section is smaller than the maximum cross section of the arriving fastening element. However, because the brake shoes are resiliently disposed, they decelerate the fastening element without clamping it immovably.

Due to the curvilinear progression of the channel, the fastening element held in the brake shoe arrangement is positioned such that using the transfer arrangement, it can be transferred to the rotary magazine. According to a preferred embodiment, the transfer arrangement is implemented by an adjusting element, in particular, a pneumatic piston cylinder arrangement, which moves, in particular, slides the fastening element out of the brake shoe arrangement into the carrier. Due to the curvilinear progression of the channel, the adjusting element of the transfer arrangement must not reach through the entire curvilinear progressing channel, rather it reaches through only the brake shoe arrangement, and in this way takes along the fastening element held there into an open retaining position of the carrier.

According to a further embodiment of the present loading apparatus, the separating arrangement has a rotatable receptacle with at least one radially aligned chamber for receiving a fastening element, where the at least one radially aligned chamber can be brought into alignment with the supply channel and a loading position of the carrier by rotation of the receptacle.

The rotatable receptacle is preferably disposed such that its axis of rotation extends at a right angle to the axis of rotation of the rotary magazine. This rotatable receptacle is supplied with a plurality of fastening elements via a channel. In each case, the foremost fastening element can be received into the radially aligned chamber within the rotatable receptacle. It is also conceivable that the rotatable receptacle has two radially aligned chambers opposite each other, or a plurality of uniformly distanced radially aligned chambers. This can be implemented, for example, using a rotatable disk which forms the rotatable receptacle of the separating arrangement. As soon as a fastening element is received in a radially aligned chamber, the rotatable arrangement turns far enough so that the outlet of the radially aligned chamber is disposed opposite to the loading position of the rotary magazine or carrier. In this position, the transfer arrangement moves the fastening element out of the radially aligned chamber into a retaining position of the carrier using compressed air, mechanical, electromechanical, electromagnetic and/or piezoelectric means. In this way, a previously vacant retaining position of the carrier is loaded and the newly loaded fastening element can be supplied via the carrier to the supply position of the setting device.

According to a preferred embodiment of the transfer arrangement at least one compressed air channel discharges into the radially aligned chamber so that via a compressed air source connected to the compressed air channel, the fastening element can be moved by means of a pulse of compressed air.

The present invention also discloses a loading apparatus for a setting device through which fastening elements, especially rivets, bolts, nails can be individually loaded into the setting device, and which has the following features: a supply channel, via which at least one or a plurality of fastening elements oriented in the correct positional orientation can be transported directly into a feed channel for setting by the setting device, because the supply channel opens directly into the feed channel, or a temporary connection between the supply channel and the feed channel can be produced, while the feed channel comprises a hollow cylindrical channel with a braking path, so that the fastening element, after the feed from the supply channel, can be positioned into a position for setting by a punch of the setting device.

The loading apparatus disclosed here is used preferably in a setting device without, for example, the use of a strip or rotary magazine. The loading apparatus enables the supply of the fastening element directly into the feed channel, thus, the individual and direct positioning of the fastening element into a position prepared for the setting by the punch. For this purpose, the fastening elements are fed into the feed channel oriented in the correct positional orientation, i.e., for example for a nail, an alignment with the point in the direction of setting. The connection between supply channel and feed channel is made within the loading apparatus, preferably via various alternative designs. On the one hand, a direct connection between the supply channel and the feed channel is produced using a Y-shaped branching of the feed channel, via one branch of which the supply channel is permanently connected to the braking path, whereas via the other branch the fastening element can be placed by means of the punch of the setting device. According to a further design, the feed channel can be moved between at least a first and a second position, where in the first position, the feed channel is connected to the supply channel for the feeding of the fastening element, and in the second position, the fastening element can be set through the feed channel by means of the punch of the setting device. The movement of the feed channel between the first and second position takes place either linearly through a shift of the feed channel and/or rotating by pivot movement of the feed channel about an axis of rotation which is preferably aligned perpendicular to the longitudinal axis of the feed channel.

The present invention further discloses a roller presser for a setting device, where the roller can be brought into contact with a component for a setting process of a fastening element, and which has the following features: a rotatably mounted wheel which can be fastened to the setting device via an arrangement, and which can be rolled on the component during a movement of the setting device, and a trigger arrangement in connection to the wheel which generates a signal depending on the revolution of the wheel, with which by rolling of the setting device on the component at locations of the component that are distanced from each other, in each case a joining process of the setting device can be initiated, where the distance between these locations is predetermined by the roll path of the wheel.

In use with setting devices, the roller presser according to the invention serves for triggering the setting processes at join locations at defined distances from each other. The distance of the join locations can be determined via the circumference of the wheel of the roller presser rolled on the component. Supplementing this trigger function, the roller presser can also be used as a hold-down device for applying a preload onto components to be joined.

According to preferred embodiments of the roller presser, a mechanical switch can be actuated depending on the rotation of this wheel, or on the part of the rotation of the wheel, in order to generate, via a mechanical trigger, a signal in the trigger arrangement. In a similar design, using the wheel the signal can be generated electrically in the trigger arrangement, preferably via a photoelectric barrier, an electric switch or an electromagnetic pulse generator. This signal in the trigger arrangement, or generally, the trigger signal is further supplied to a control of the setting device, in order to perform the setting process at the location identified by the rolling of the wheel of the roller presser. In this way, the joining of fastening elements is facilitated because the distance of the fastening elements or the join locations is predetermined by the roller presser. In addition, the roller presser automatically triggers the setting processes such that the setting device must specify through its movement only the path, along which the fastening elements are to be set into the component. Therefore, using the roller presser a semiautomatic setting of the fastening elements is possible.

The present invention also discloses a setting device, as is disclosed, for example, in DE 20 2006 016 504, with which a fastening element can be inserted in a join location, and which has a feed apparatus and/or a feed channel according to the designs described above, or any selection from the components named above, feed apparatus, feed channel and loading apparatus. A further alternative of the setting device comprises the loading apparatus described above with which fastening elements can be fed to the feed channel without the use of a strip magazine or rotary magazine.

Furthermore, the present invention provides a setting device with which a fastening element can be inserted in a join location, and which has a feed apparatus with a rotary magazine and/or a feed channel, where above the rotary magazine a storage magazine is disposed in which a plurality of fastening elements can be received and from which the fastening elements can be dispensed into the rotary magazine.

According to a further design, the above named setting devices have the described roller presser and/or a hold-down arrangement, which is disposed between an arrangement supporting the setting device, for example, a robot and the setting device, in order to implement a hold-down function of the setting device, and in order to dampen reaction forces of the setting device with respect to the supporting arrangement during setting of fastening elements. In addition, this hold-down arrangement preferably guarantees a force controlled placement of the setting device onto the work piece that can be implemented using a hold-down arrangement functioning pneumatically or hydraulically.

In addition, the present invention discloses a method for feeding fastening elements into a setting device, which comprises the following steps: loading a first fastening element at a loading position in a carrier, in particular, in a rotary magazine, unloading a second fastening element at a feed position into a feed channel of the setting device, through which the second fastening element is joined, where the loading and unloading occurs simultaneously according to a preferred embodiment. It is also preferred, depending on the processing procedures of the setting device to be used, to implement a temporally offset loading and unloading of fastening elements.

In addition, the present invention discloses a method for joining fastening elements, in particular, rivets, bolts, nails with a setting device as, for example, described above, and the method has the following steps: advancing the setting device into contact with one of the components to be connected so that the components to be connected are preloaded against each other without a separately moved hold-down device, and inserting the fastening element into the components to be connected. In a further design of this method, the advancing occurs by moving the entire setting device using a robot, until the setting device contacts, via a hold-down device, especially a feed channel, one of the components to be connected and preloads them. On the basis of these method steps, each individual join location is accessed individually so that the travel movement of the setting device over multiple join location is interrupted at each join location in order to insert the fastening element. The method described above preferably includes the following further step: decelerating the fastening element within a feed channel by means of friction between the fastening element and a braking path of the feed channel and/or decelerating of the fastening element to be inserted within a feed channel by means of counter air, wherein compressed air is blown into the feed channel counter to the setting movement of the fastening element, or due to the contact of the setting device on the component a ram pressure is generated in the feed channel between the fastening element and the component.

According to a further embodiment of the present invention, the above method comprises the further steps: moving the setting device over a plurality of join locations, while the hold-down device of the setting device preloads the components to be joined and is in contact with one of the components to be joined, and inserting the fastening elements at the plurality of join locations, with or without interrupting the movement of the setting device over the plurality of join locations at the individual join location.

Using this alternative method, the setting device is continually moved over the plurality of join locations, preloads the components to be connected, despite this continual movement due to the contact of the hold-down device or of the setting device on at least one of the components, and inserts the respective fastening element at the individual join location during this continual movement of the setting device. For this purpose, the setting device uses a hold-down device with a roller presser, which on the one hand permits the application of a preload on the components to be connected, and on the other hand, permits a unimpeded movement of the hold-down device or setting device in contact with at least one of the components. Furthermore, it is preferred to equip this roller presser with at least one recess such that a movement of the roller presser is not impeded by an inserted fastening element, for example, a head of a nail projecting at the surface. In addition, the roller presser is preferably equipped with a trigger arrangement which, depending on the roll path of the roller presser on the component, initiates a trigger signal for starting a setting process of the setting device. Therefore, the method according to the invention preferably has in addition the following further steps: Rolling of the setting device on one of the components to be connected using a roller presser and generating a signal using the roller presser depending on a rotation of the roller presser that initiates in each case a setting process so that the rotation of the roller presser specifies the join location.

In addition, the present invention discloses a method for joining fastening elements, in particular, rivets, bolts, nails with a setting device, in particular, a setting device according to the preceding description, which has the following steps: preloading a plurality of components to be connected using a preload design, that is independent of the setting device, advancing the setting device to the components to be joined, without the setting device contacting one of the components to be connected, and inserting the fastening element into the components to be connected.

According to this embodiment, the insertion of fastening elements occurs on-the-fly of the setting device at the plurality of join locations. With this process, the setting device or the hold-down device is not placed on the components to be joined, such that the joining occurs from a preset distance between the setting device and component. This procedure enables also the insertion of the fastening elements at the plurality of join locations with or without interrupting the movement of the setting device at the individual join locations.

Furthermore, the methods described in the preceding can preferably be optimized with the functions of a roller presser. Therefore, they have the following supplementary steps: placement and rolling of a roller presser on the component in conjunction with a movement of the setting device, without or in order to thereby preload the components, and generating a signal with the roller presser depending on a rotation of the roller presser, that in each case initiates a setting process of the setting device such that the rotation of the roller presser specifies the join location

3. BRIEF DESCRIPTION OF THE ACCOMPANYING DRAWINGS

Figure 6:
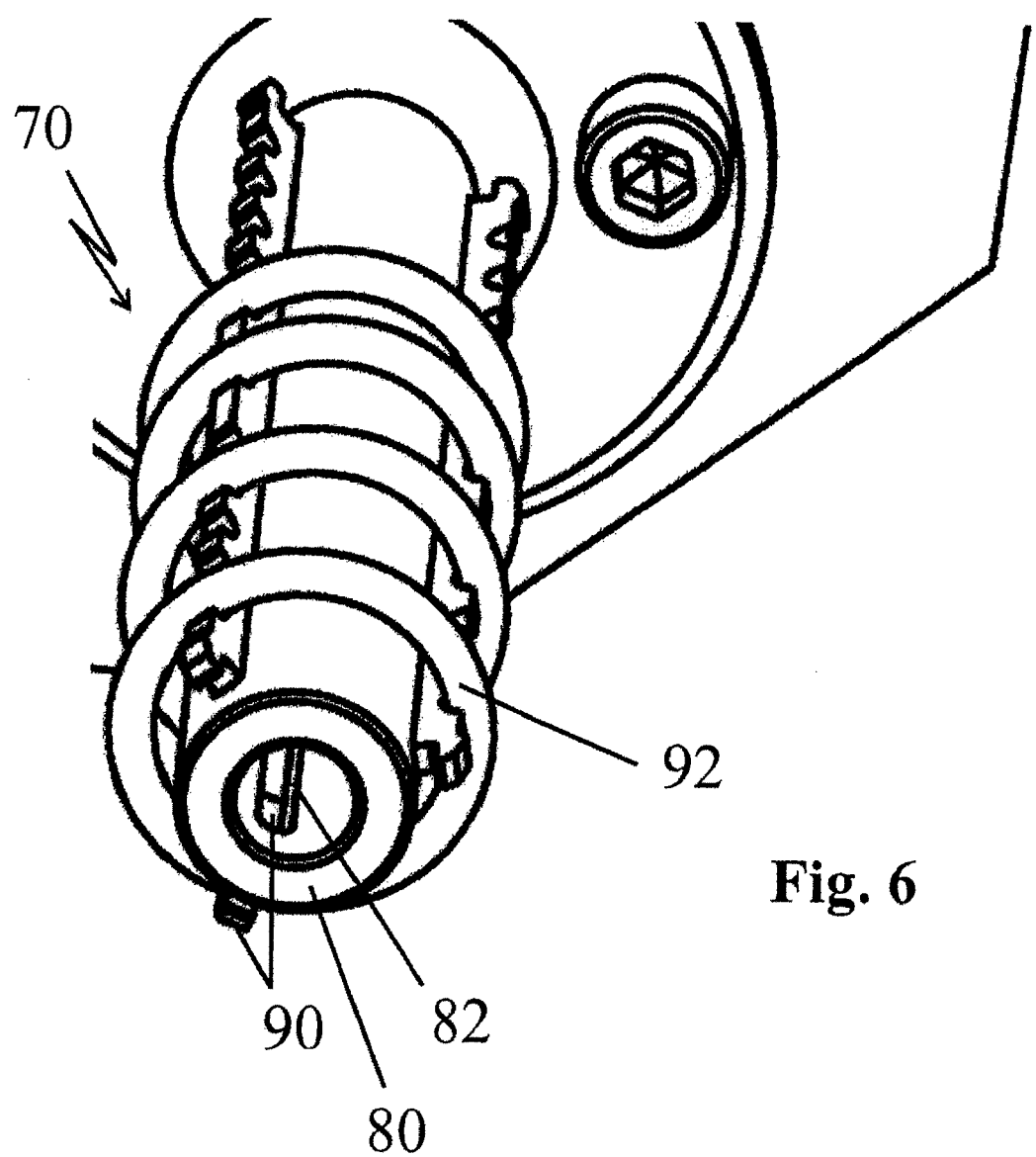
Figure 7:
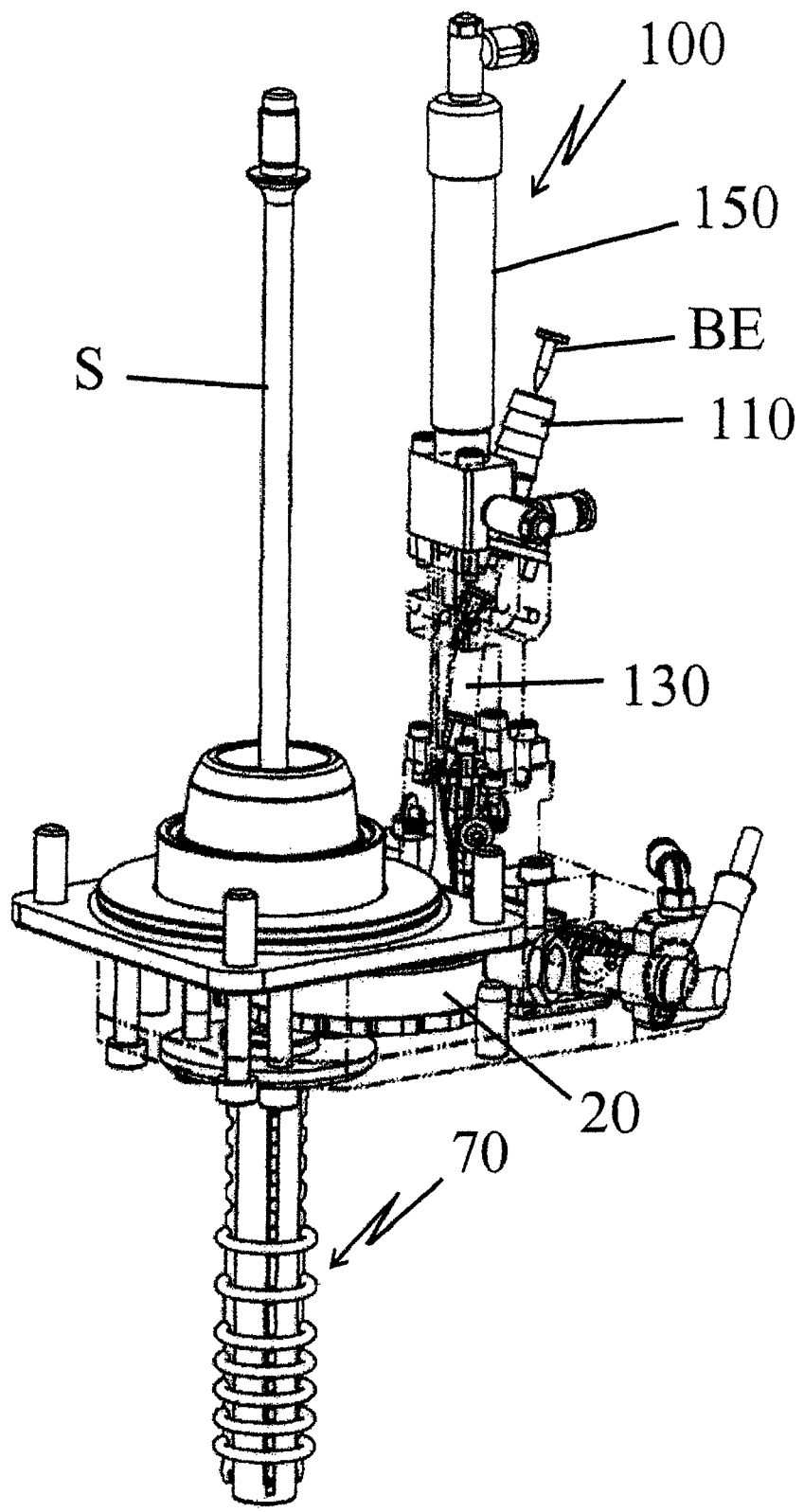
Figure 8:
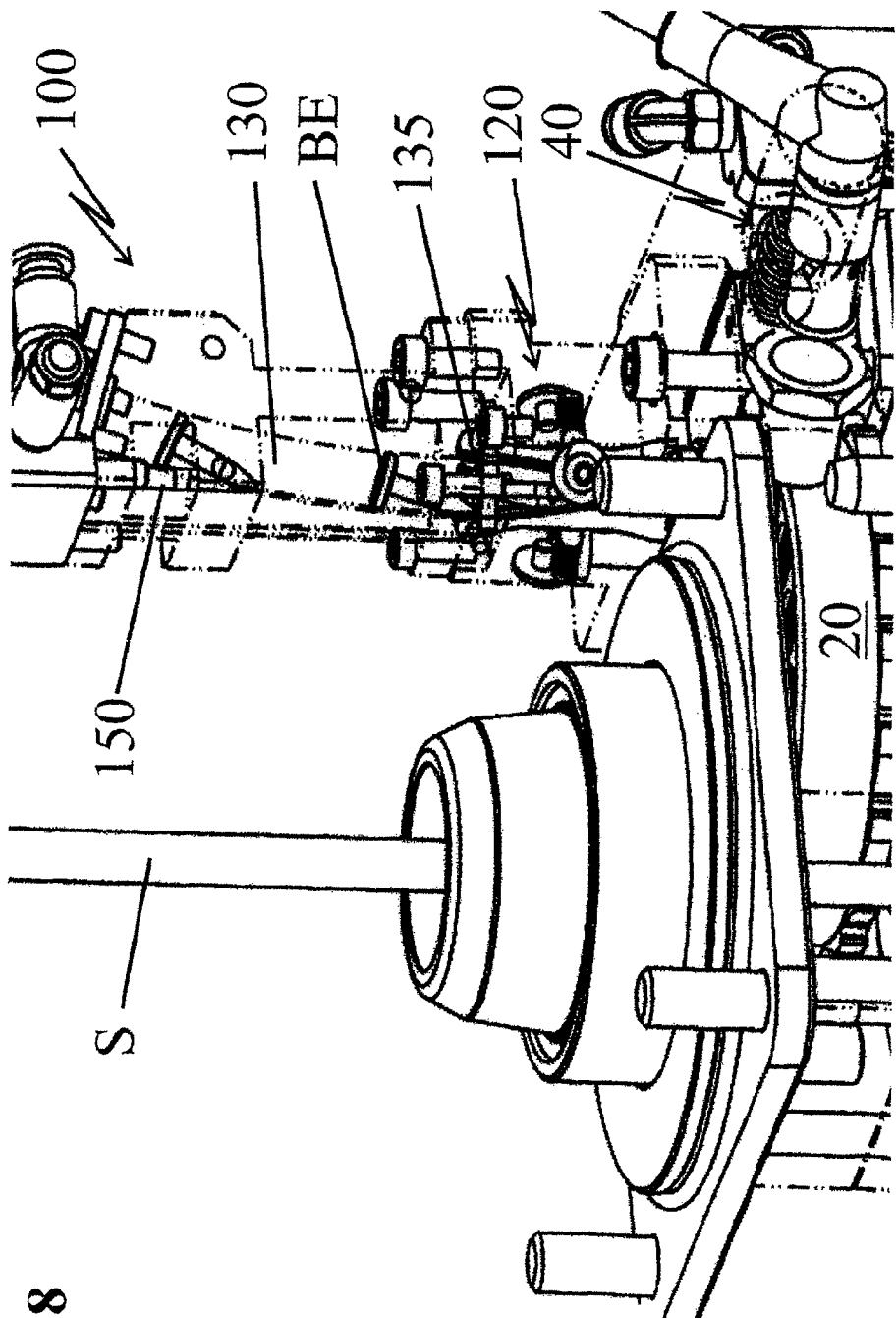
Figure 9:
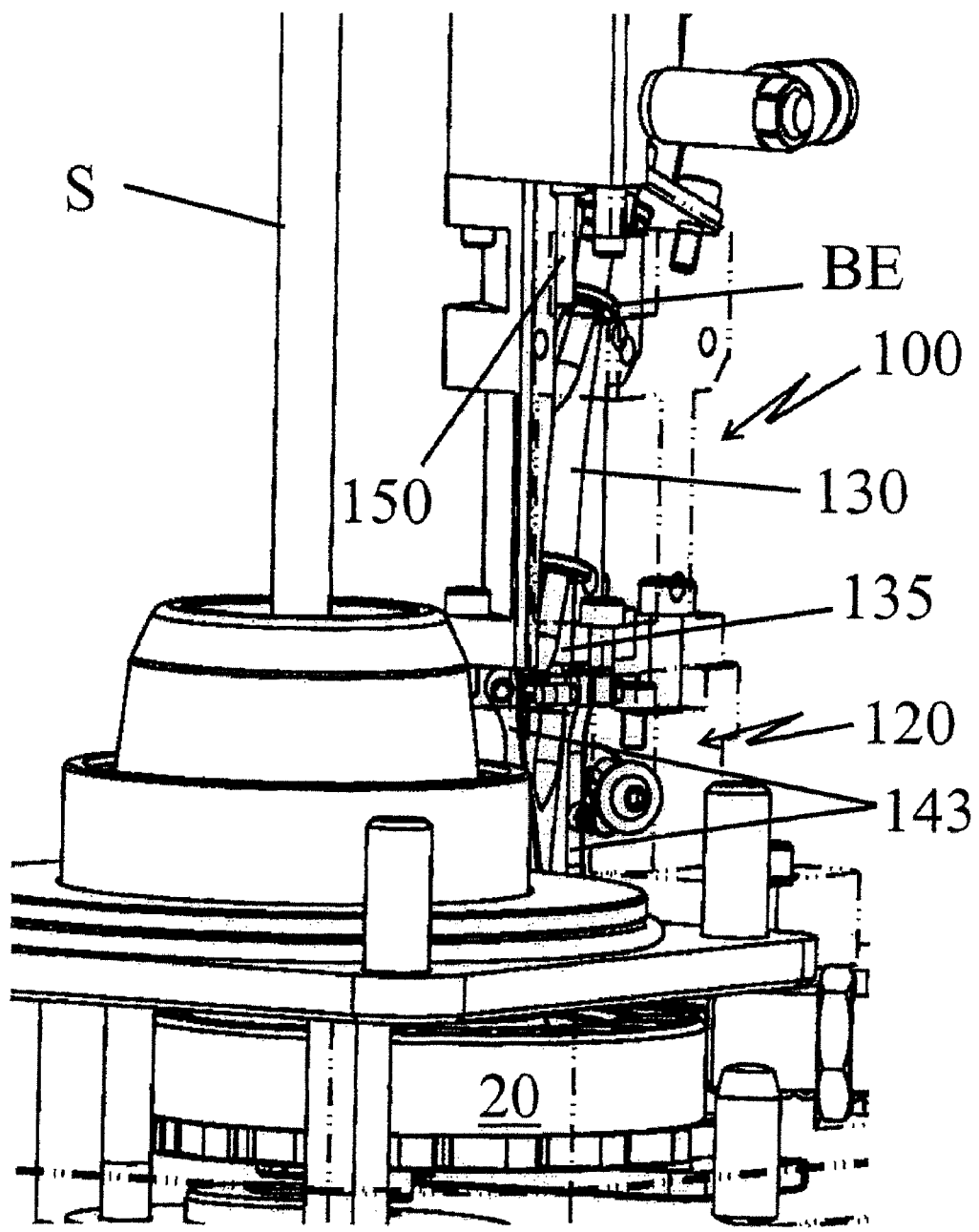
Figure 22:
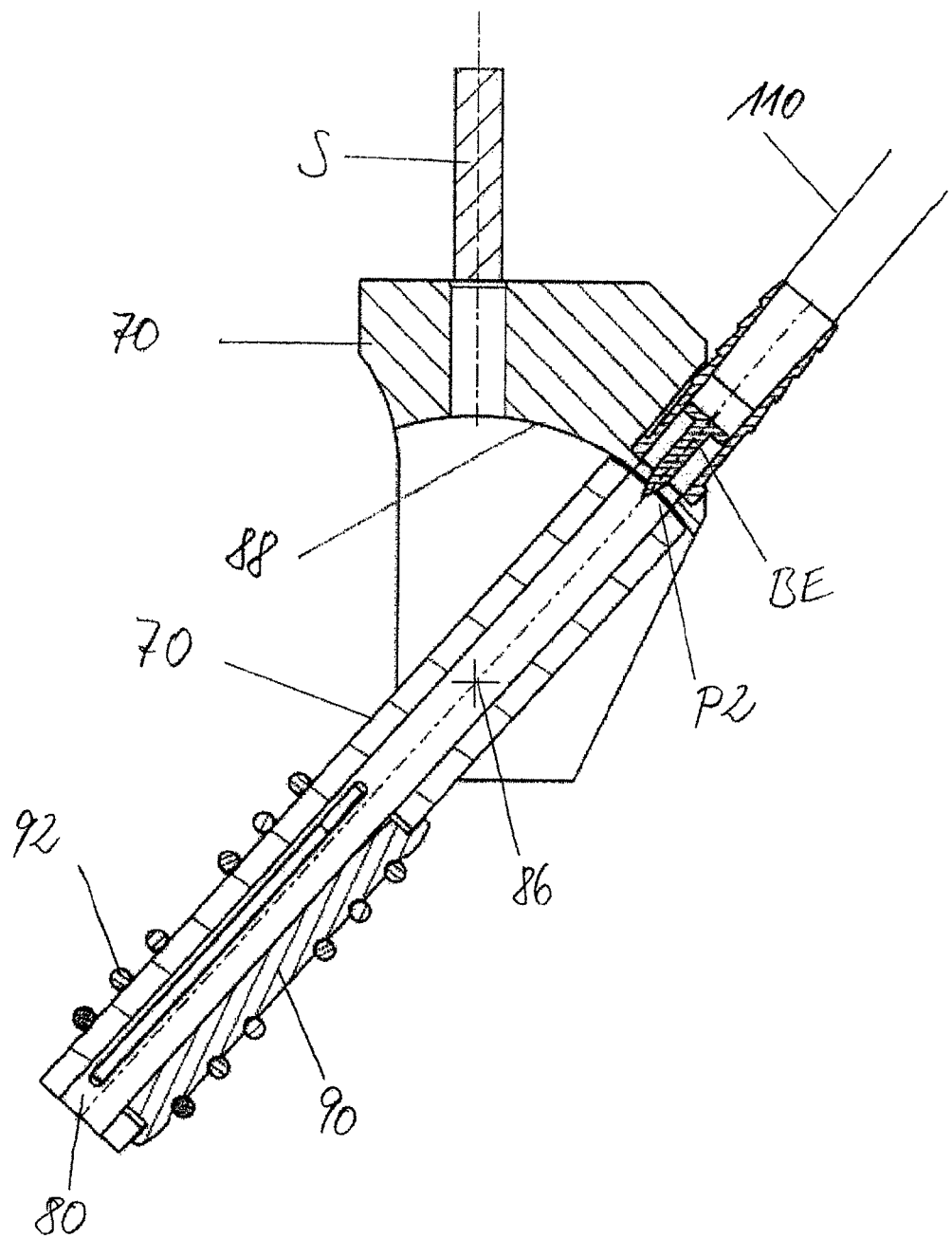
Figure 23:
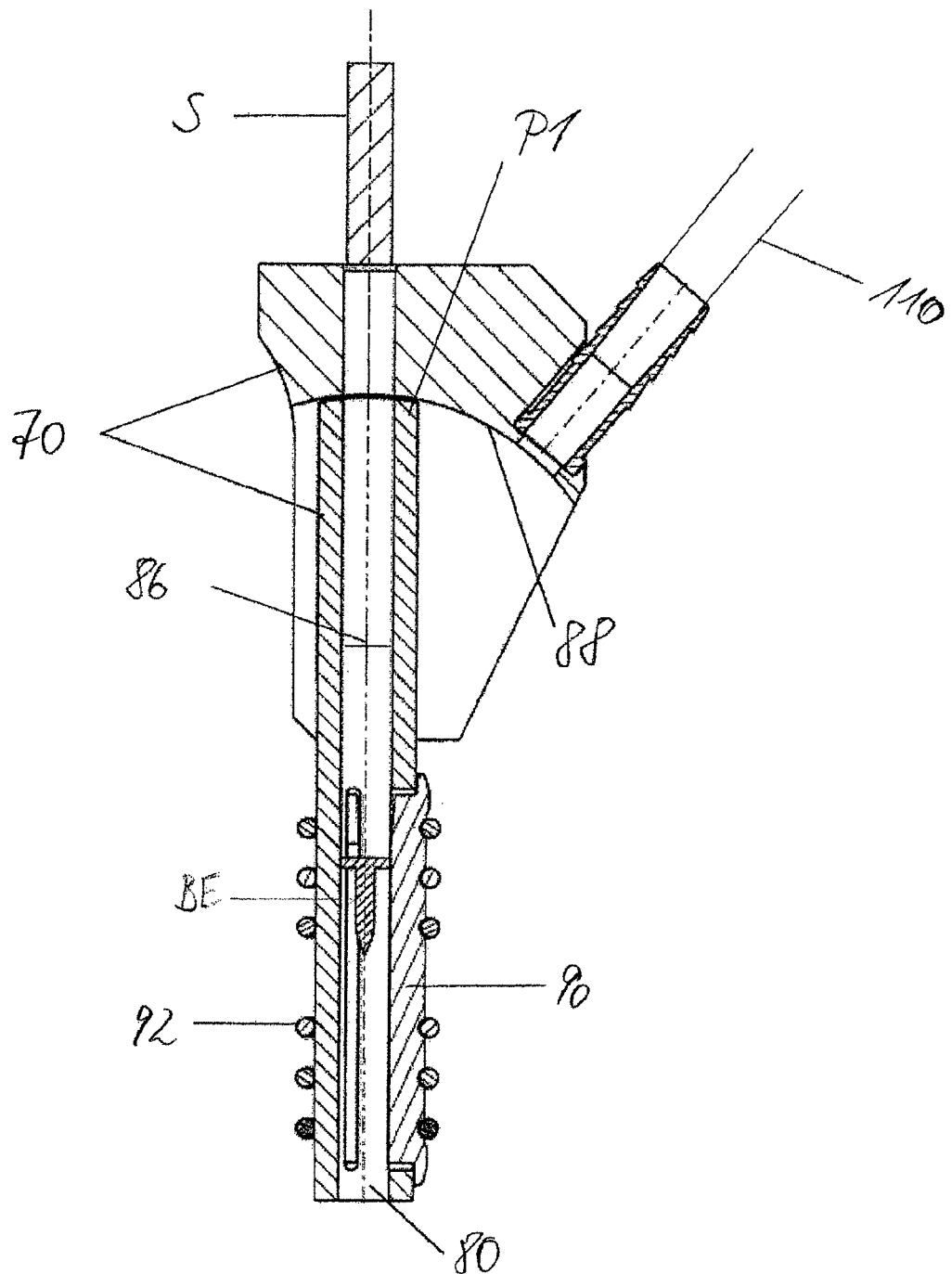

The present invention is explained in more detail in reference to the accompanying drawings. They show:

FIG. 1 a perspective view from above of a first embodiment of the present invention, FIG. 2 a perspective view from below of the first embodiment of the present invention, FIG. 3 a sectional enlargement from the perspective view according to FIG. 1, FIG. 4 a perspective view from above of a further embodiment of the present invention, FIG. 5 a perspective view from below of the further embodiment of the present invention, FIG. 6 a perspective view of a preferred embodiment of the feed channel according to the present invention, FIG. 7 a perspective view of a preferred embodiment of the present invention with loading apparatus, FIG. 8 a sectional enlargement of the preferred embodiment from FIG. 7, FIG. 9 a sectional enlargement of the embodiment from FIG. 7, FIG. 10 an enlarged representation of the preferred brake shoe arrangement, FIG. 11 a perspective view of a further embodiment of the present invention with loading apparatus, FIG. 12 an enlarged representation of the preferred loading device from FIG. 11, FIG. 13 an enlarged representation of the embodiment from FIG. 11 viewed from behind, FIG. 14 a preferred embodiment of a bar of the braking path from FIG. 6, FIG. 15 a longitudinal section of a preferred embodiment of a feed channel with brake shoes, FIG. 16 a sectional representation through the feed channel from FIG. 15 along the line B-B, FIG. 17 a preferred embodiment of a feed channel with a compressed air connection, FIG. 18 a perspective view of the feed channel from FIG. 17, FIG. 19 a sectional view through the feed channel from FIG. 17 along the line A-A, FIG. 20 a sectional view through the feed channel from FIG. 17 along the line B-B, FIG. 21 a preferred embodiment of a loading apparatus for the direct feed of the fastening elements into the feed channel, and FIGS. 22 and 23 a further preferred embodiment of a loading apparatus for the direct feed of the fastening elements into the feed channel.

4. DETAILED DESCRIPTION OF PREFERRED EMBODIMENTS

The feed apparatus 1 according to the invention, in general, is used in setting devices for inserting fastening elements, such as rivets, bolts, nails and the like. A preferred embodiment uses the feed apparatus 1 in conjunction with the setting device described in DE 20 2006 016 504. Using the design described in the following, fastening elements are fed and joined faster in comparison to the state of the art. This enables, for example, joining work pieces "on the fly", that is, without having to stop the setting device at each join location, in order to wait for the join process.

Figure 2:
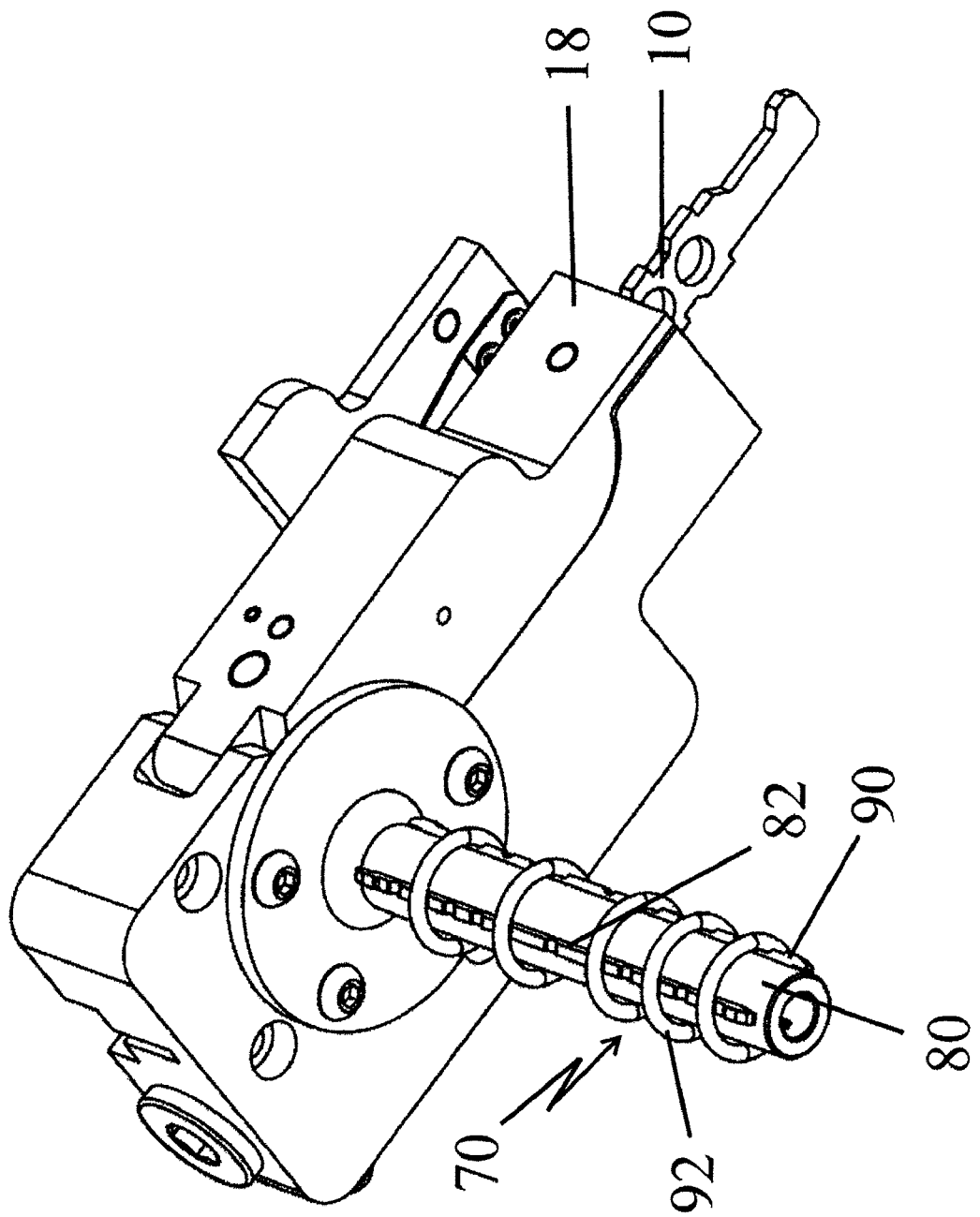

FIG. 1 shows a perspective view of the feed apparatus 1 from above, while FIG. 2 represents a perspective view of this embodiment from below. Using this feed apparatus 1, a fastening element is brought into a feed position FP, from where the join process is performed directly or indirectly using a punch S of the setting device. A plurality of fastening elements is held in a carrier 10; 20. In a preferred embodiment, the carrier is designed in the shape of a strip magazine 10. This strip magazine 10 comprises uniformly spaced retaining positions 12 in the form of openings in which, in each case, one fastening element is held. These openings can have retaining means adapted to the corresponding fastening element, such that the strip magazine 10 can be used within the setting device in any orientation. It is possible, for example, to provide a strip 10 composed of sturdy plastic or metal with ten to twenty retaining positions 12. A further alternative represents a known carrier strip, on the basis of whose length a multiplicity of fastening elements can be fed.

The strip magazine 10 comprises a barb shaped structure 14 on at least one of the lateral end surfaces. It is preferred to provide such a barb-shaped structure 14 on both lateral end faces, as is represented in the FIGS. 1 and 3. This barb-shaped structure 14 is formed such that the strip magazine 10 can be moved in only the direction given by the arrow in FIG. 1. Preferably, this movement occurs in equidistant steps, where the step size comprises the distance between the midpoints of two adjacent retaining positions 12. With the selection of this step size it is possible that with each step the next retaining position 12 is disposed above the feed position FP. Thereby, with each step of the strip magazine 10 a new fastening element is positioned at the feed position ZP or in front of the entrance of the feed channel 70, such that it can be joined by the punch P.

Figure 3:
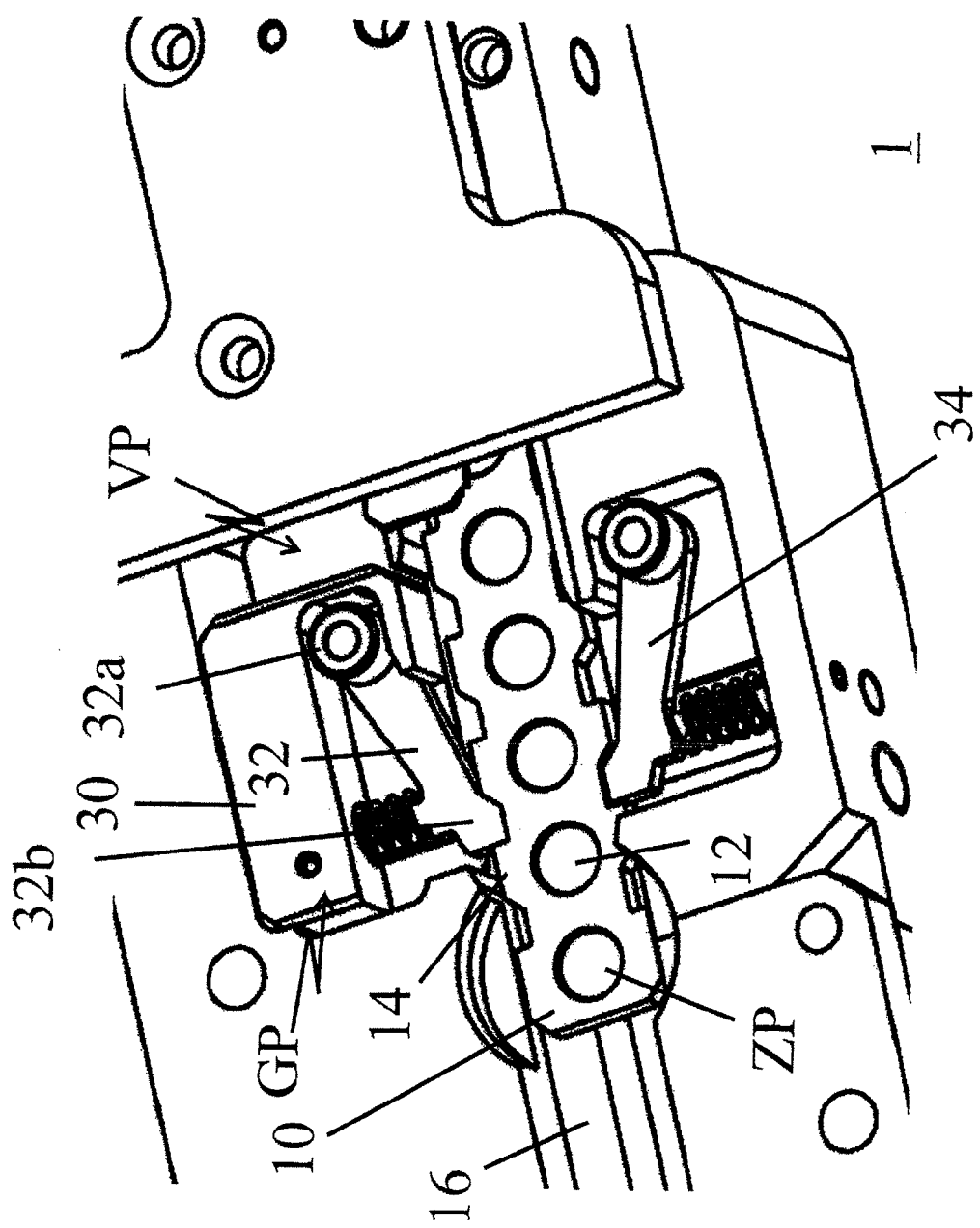

FIG. 3 shows a sectional enlargement of FIG. 1, in which the feed mechanism for the strip magazine 10 and also for the rotary magazine 20, described subsequently, is illustrated in greater detail. This feed mechanism includes a slide 30 which is movably disposed in a recess of the housing. The slide 30 can be moved between an advance position VP and a home position HP, where according to a preferred embodiment this movement is performed using a linear sliding of the slide 30. In order to implement this movement, the slide 30 is connected to a piston cylinder arrangement 40 according to FIG. 4.

Figure 4:
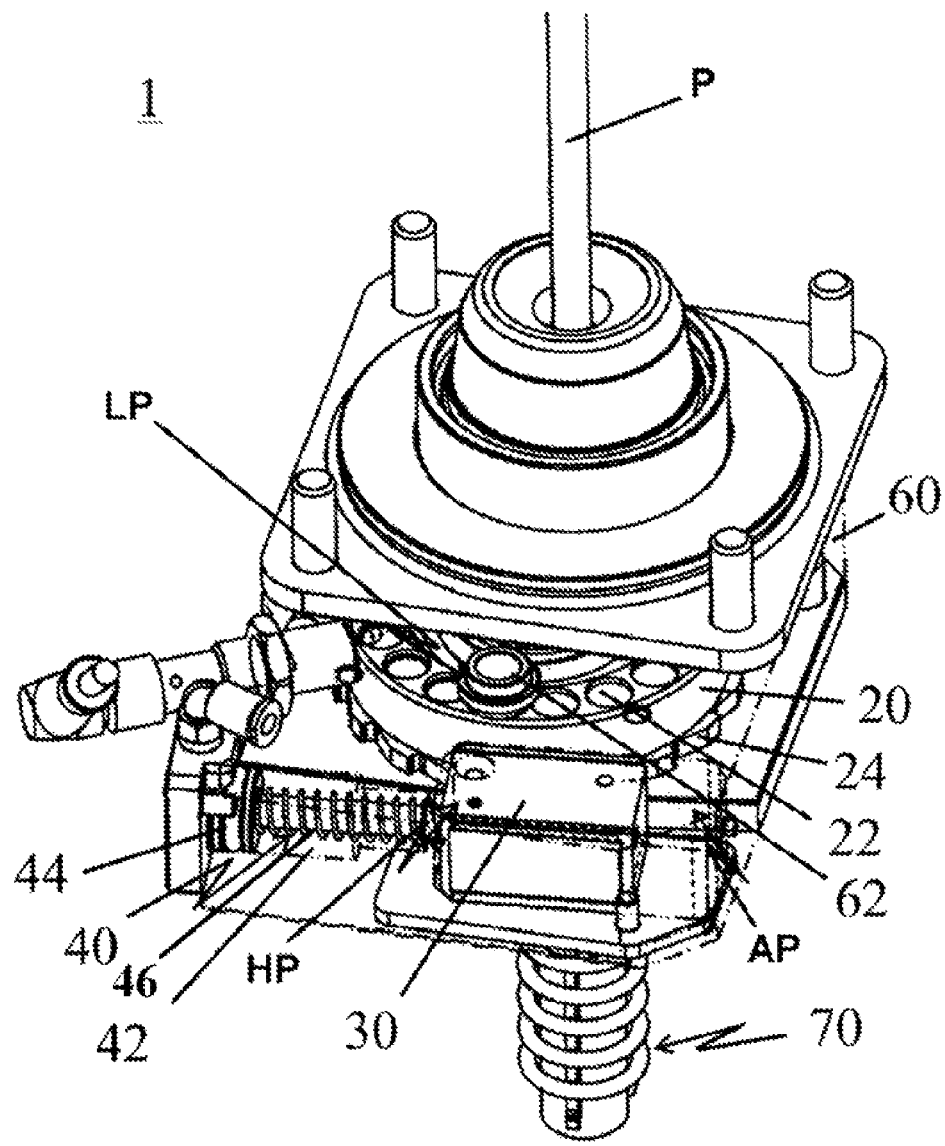

The piston cylinder arrangement 40 is composed of various constructive components, as can be discerned from FIG. 4. Even though FIG. 4 shows an embodiment of the feed apparatus 1 with a rotary magazine 20, this piston cylinder arrangement 40 is contained in the same manner in the feed arrangement 1 according to FIGS. 1 to 3.

Within the housing of the feed arrangement 1 (see FIG. 4) a hollow cylinder 42 is formed. The piston 44 can be moved pneumatically within the hollow cylinder 42. The piston 44, on the other hand, is permanently connected to the slide 30. A spring 46 is disposed between the head of the piston 44 and the end of the cylinder 42 within the housing of the feed apparatus 1. If the piston 44 is loaded with air pressure, it slides within the hollow cylinder 42 and thereby moves the slide 30 from the home position GP into the advance position AP. As can be discerned in FIGS. 1 and 3, during the movement from the home position GP into the advance position VP the slice 30 moves counter to the direction of the arrow in FIG. 1. In the process, the spring loaded advance arm 32 with its second end 32b located at the strip magazine 10 jumps over the adjacent barb. Due to the spring loaded blocking lever 34 and its catch in the barb-shaped structure 14, the strip magazine 10 is prevented from following the movement of the slide 30 counter to the direction of the arrow in FIG. 1. It is also preferred that the movement of the slide 30 from the home position GP into the advance position VP is performed precisely when the punch S reaches through the opening or retaining position 12 of the strip magazine 10, which is located at the feed position FP. In this case, a movement of the strip magazine 10 counter to the direction of the arrow would also be prevented by the punch P, so that blocking lever 34 can be omitted.

If the slide 30 is located in the advance position AP, the slide 30 is spring biased in the direction of the home position GP by the compressed spring 46 between the head of the piston 44 and the end of the cylinder 42. If the punch S is now removed out of the opening of the strip magazine 10 at the feed position FP, or the strip magazine 10 is released in another manner, such that it can move in the direction of the arrow according to FIG. 1, the spring loading of the slide 30 generates the advance of the strip magazine 10 by an equidistant step, already previously mentioned. The slide 30 is then located again in the home position HP, the advance arm 32 is again disposed across from the blocking arm 34 because this catches the next barb, and the next opening or retaining position 12 of the strip magazine 10 with a fastening element is disposed at the feed position FP.

It is preferred to equip the carrier 10; 20 that is used with a friction brake (not shown). This prevents excessive acceleration during the advance of the carrier 10; 20 over the slide 30. A spring, for example, acts as a friction brake, in that the spring presses the carrier 10; 20 against the housing of the feed mechanism or of the setting device. Thereby, due to friction between the carrier 10; 20 and the housing, the movement of the carrier 10; 20 is only decelerated or impeded to the extent that the carrier 10; 20 moves adapted to its feed function of the fastening elements. Such a friction brake acts, for example, counter to the inertia of the carrier 10; 20, in order to dampen an excessive acceleration of the carrier 10; 20 during a feed movement.

It is also preferred to implement the piston cylinder arrangement 40 using a mechanical, electromechanical, electromagnetic, or piezoceramic apparatus.

As can also be discerned in the FIGS. 1 and 3, the strip magazine 10 is moved in a track 16 of the housing of the feed apparatus 1. This track 16 comprises, for example, a centered groove such that the head of the fastening elements can be held in the openings/retaining positions 12 of the strip magazine 10, while the shaft in each case moves in the centered groove of the feed track 16. In addition, it is preferred to provide a flap apparatus 18 on the side at the feed apparatus 1. This apparatus is fastened on the feed apparatus 1 pivotable about an axis of rotation such that after opening the flap apparatus 18 in the direction of the arrow 19 (see FIG. 1), the insertion of the strip magazine 10 is facilitated.

Figure 5:
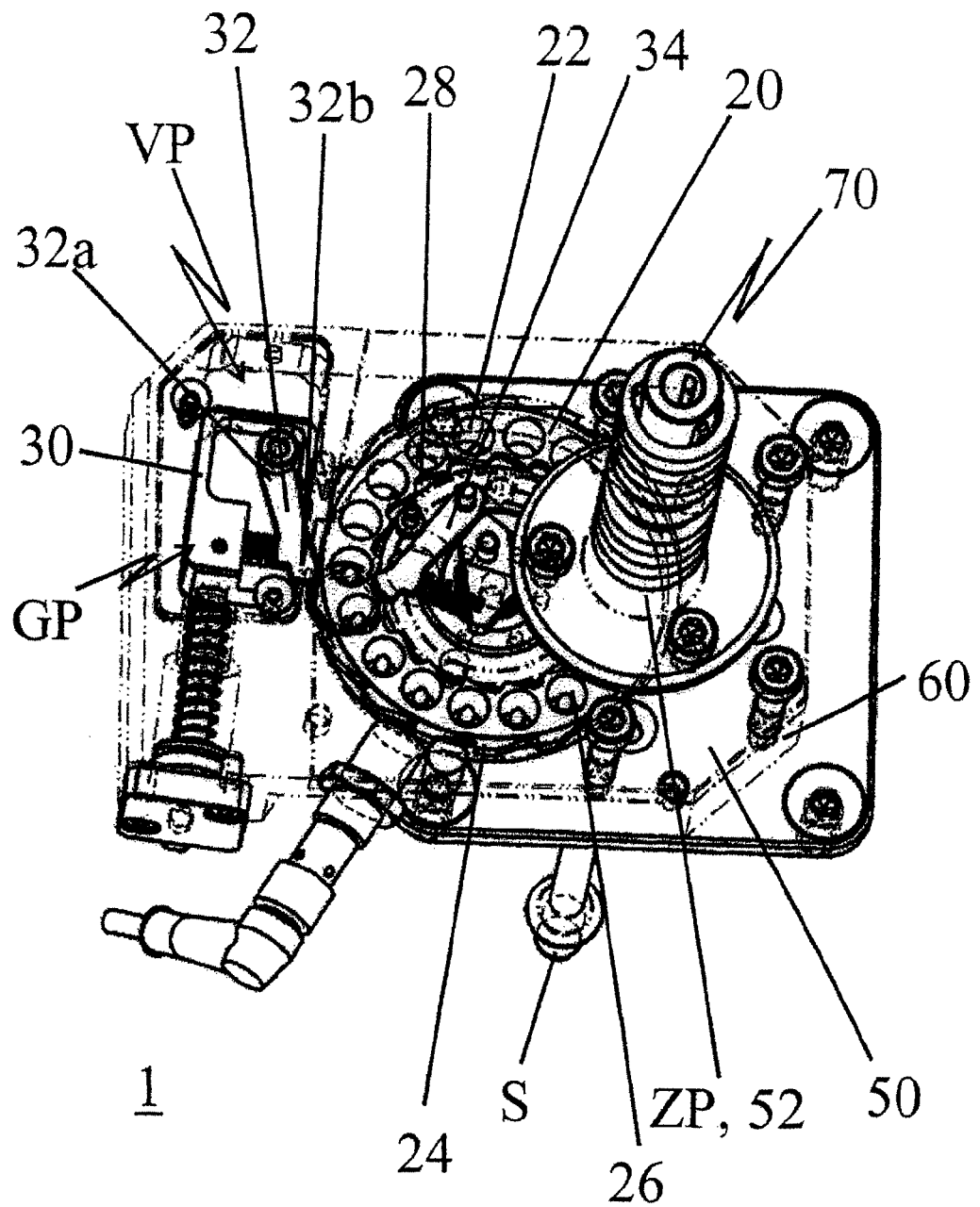

According to a further embodiment of the present invention, the carrier is designed as a rotary magazine 20 according to the FIGS. 4 and 5. The rotary magazine 20 consists of a ring shaped design which has uniformly spaced chambers 22 along its peripheral direction. These chambers 22 are designed in site preferably such that they can receive fastening elements in the correct positional orientation.

The rotary magazine 20 is bounded below by the plate 50. It is also conceivable to dispose the rotary magazine 20 in a closed housing so that the fastening elements cannot fall out of the chambers 22. The opening 52 in the plate 50 is preferably located above the opening of the feed channel 70 and corresponds to the feed position ZP for the fastening element according to the arrangement from FIG. 3.

When the rotary magazine 20 is moved further one step onward in the same manner as the strip magazine 10 by the piston cylinder arrangement 40 with the slide 30, the next chamber 22 is disposed above the feed position FP. In this manner, the next fastening element is supplied for the join process by the punch P. The stepwise movement onward of the rotary magazine 20 occurs in a manner as was described above in connection with the strip magazine. For this purpose, the rotary magazine 20 has the barb-shaped structure 24 on the outside of its periphery (see FIG. 5). Furthermore, at the inside of the periphery, the barb-shaped structure 28 can optionally be formed in order to dispose, for example, a blocking means in the form of a pivotable lever 34. However, it is also possible to use the punch S as a blocking means, in the same manner as described in reference to FIG. 3, if the punch moves straight through one of the chambers 26 at the feed position FP.

The chambers 22 are closed on the top of the rotary magazine 20 by a cover plate 60. At a loading position LP, an opening 62 is provided in the cover plate 60 through which new fastening elements are fed to empty chambers 22 of the rotary magazine 20. Because the loading position LP and the feed position ZP are at different locations, it is possible to perform feeding and joining of fastening elements simultaneously. With the reloading or filling of the rotary magazine 20 with fastening elements. In this way, idle times of setting device can be reduced and an unlimited number of fastening elements can be reloaded into the rotary magazine 20 with a high frequency.

In particular with the embodiment according to the FIGS. 4 and 5, a feed method of fastening elements into a setting device can be realized in which, first, a loading of the first fastening element occurs at a loading position LP in the rotary magazine 20. Simultaneously to this loading process, an unloading of a second fastening element occurs at a feed position ZP into the feed channel 70 of the setting device through which the second fastening element is joined. The feed channel 70 can also be called the mouthpiece of the setting device. During the setting process the feed channel 70 is located briefly above the component surface or engages with it in order, for example, to preload the component and/or to close the feed channel 70 (see below). Thus, using this specific procedure, a simultaneous effective joining of fastening elements and resupply of fastening elements is guaranteed. It is also preferred, depending on the process routines of the setting device to be used, to implement a temporally offset loading and unloading of fastening elements.

If using the strip magazine 10 or the rotary magazine 20, a fastening element was disposed at the feed position FP, the join process is started by the setting device and its punch P. The fastening element located in the strip magazine 10 is released or knocked out of the corresponding retaining position by the punch P. After this process, the fastening element initially proceeds ahead of the end face of the punch P. If the fastening element is located in a chamber 22 of the rotary magazine 20, the fastening element falls through the opening 52 into the feed channel 70. At this moment also, the fastening element proceeds ahead of the end face of the punch P. In the feed channel 70, the fastening element is decelerated so that the end face of the punch S comes in contact with the fastening element, for example, with the head of the rivet or with the head of a bolt. Now, the fastening element and the punch S move together in contact through the feed channel 70 in the direction of the join location. Due to the contact with one another, the fastening element is aligned and exactly positioned, which is additionally supported by a centering effect of the feed channel 70.

In order to guarantee this function, the feed channel 70 is composed of a hollow cylindrical channel 80. This hollow cylindrical channel 80 has slots 82 running in its longitudinal direction. Movable bars 90 are disposed within these slots, projecting radially into the channel 80. These bars 90 are spring biased radially inward into the channel 80, and can yield resiliently radially outwards. The bars 90 are preferably composed of plastic, metal or another abrasion-resistant material. For attaining the spring bias, the bars 90 are pressed by a spiral spring 92 or by axially distributed spring rings into the interior of the channel 80.

The bars 90 project in to the interior of the channel 80 to the extent that the passage cross section of the channel 80 is reduced. The goal of this design is to reduce the passage cross section of the channel 80 to the extent that the passage cross section is smaller than a maximum cross section of a fastening element. Here, for example, the diameter of the head is the relevant measurement for a bolt with a head. Now when a fastening element moves through the feed channel 70, it is stopped by the bars 90 projecting into the center of the channel, and centered in the channel 80. Because the bars 90 can yield against the spring force acting from outside, the fastening element is not stuck immovably in the feed channel 70, but rather it can be moved onward by the following punch P. Thus, after contact of the punch S at the fastening element, an alignment occurs through the end face of the punch P, and the contact of the fastening element at the bars 90. In this manner, the fastening element is fed as precisely as possible to the join location.

According to a further design of the bars 90, their ends that project radially into the channel 80 are equipped with surface elements (not shown). As a result, the bars 90 have a T-like structure in their cross section. The orthogonal to these surface elements is preferably aligned radially, so that the surface elements have, for example, a curvature similar to the interior wall of the channel 80. Due to the surface elements it is guaranteed that the bars 90 do not engage only in isolated locations on the fastening elements, in order to create a specific alignment. If the surface elements nearly adjoin each other, according to one embodiment, they retain the fastening element in this manner nearly on the entire periphery, for example, the head of a nail, in order to align the nail. It is further conceivable that the bars 90 project further in the radial direction into the channel 80 with increasing distance from the feed position. This arrangement guarantees that even with varying diameters of the fastening elements, they are decelerated by the bars 90 and are aligned.

Figure 14:
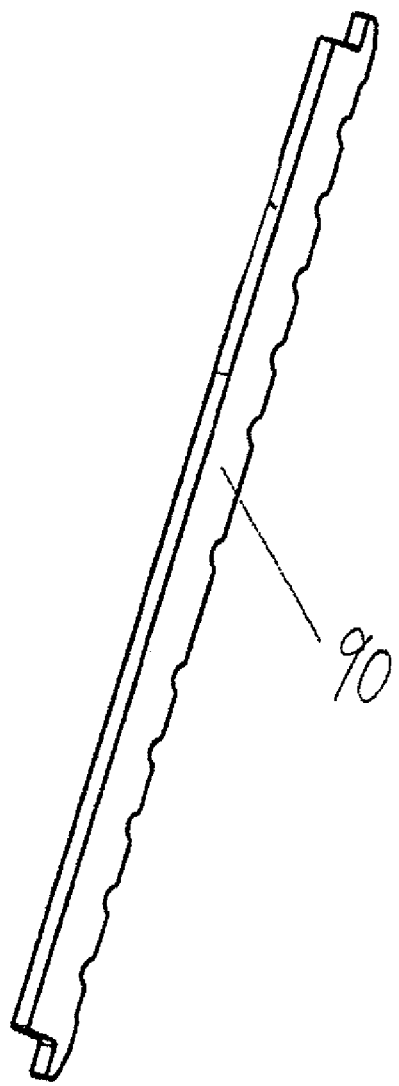

FIG. 14 shows a further preferred embodiment of the bars 90. The bar 90 represented here by way of an example, does not have a T-like structure. The side of the bar represented on the right in FIG. 14 shows the side disposed outside of the channel 80, while the end face of the bar represented on the left in FIG. 14 shows the side of the bar projecting into the channel 80. A the outside of the bar 90, indentations can be seen into which, for example, the spring rings 92 or a spiral spring, already named previously, engage. Therefore, through the indentations and the engaging spring, the bar 90 is pressed into the interior of the channel 80. The end side of the bar 90 projecting into the channel 80 is designed, for example, as a straight plane. In the same manner as previously described in reference to the T-like structure, this end face projecting inwards is preferably also designed as a curved plane. The curvature of this plane proceeds such that the orthogonal to this inward projecting plane in each case is aligned radially towards the center of the channel 80. Thereby, it is guaranteed that this end face projecting into the channel 80 does not only contact the fastening element in isolated locations, but with its entire available width.

According to a further embodiment of the present invention, the feed channel 70 is equipped with brake shoes 90B instead of the previously described bars 90. A preferred embodiment is shown in FIG. 15 in a longitudinal section, while FIG. 16 shows a cross section through the hollow cylindrical channel 80 with brake shoes 90B. As can be seen in FIG. 15, the feed channel 70 comprises the hollow cylindrical channel 80, into which the fastening element FE enters at its upper end represented in the FIG. 15. The arrangement of brake shoes 90B is located near the lower end of the feed channel 70 represented in FIG. 15. These brake shoes are biased in the direction of the interior of the hollow cylindrical channel 90, using springs 92 in the same manner as the previously described bars 90. Suitable springs 92 are, for example, spring rings or a spiral spring.

Figure 15:
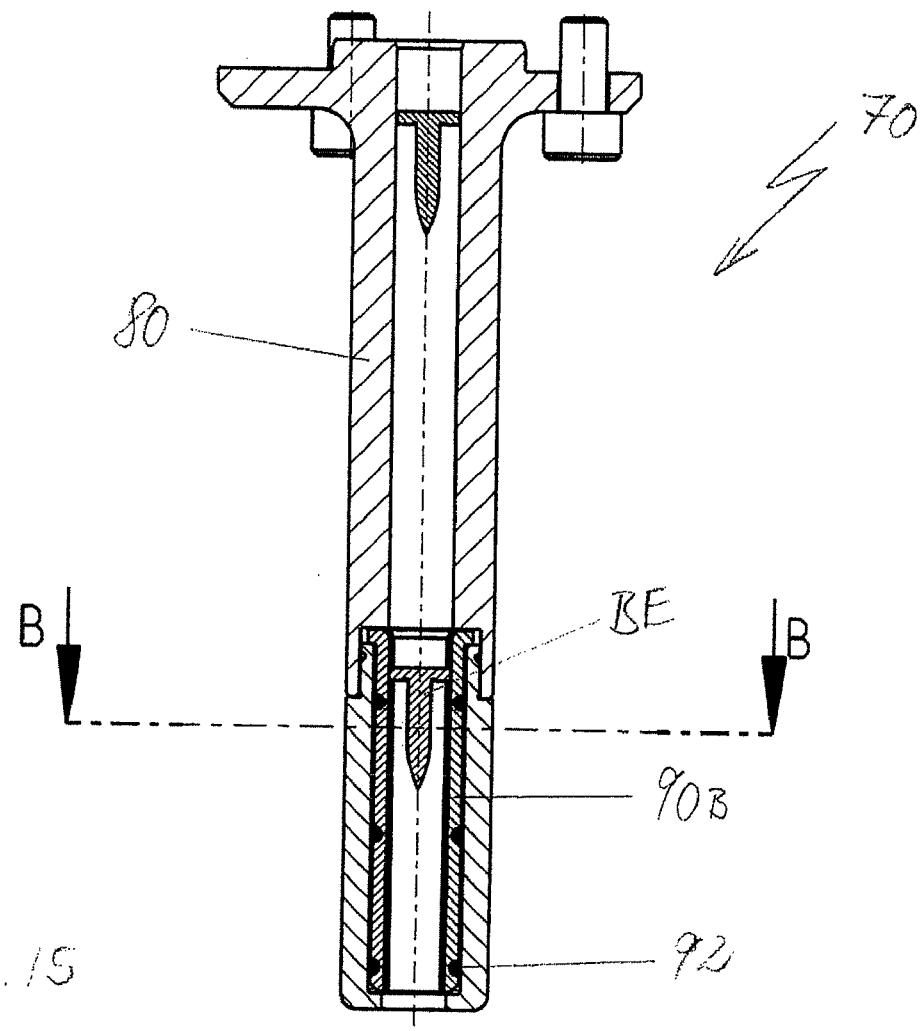
Figure 16:
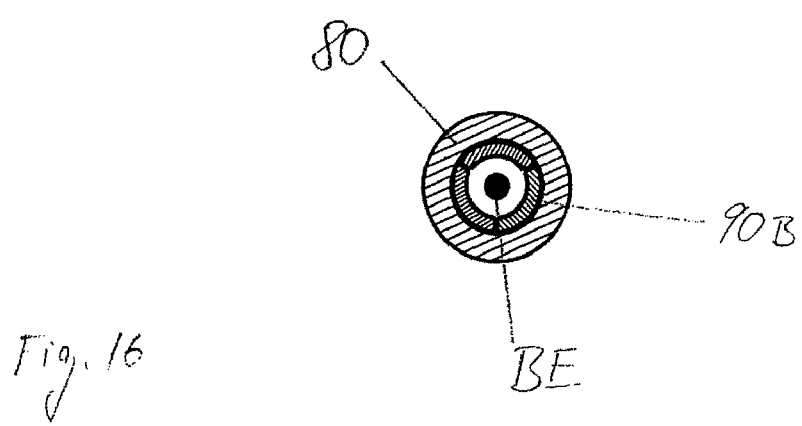

FIG. 16 shows the cross section of the feed channel 70 along the line B-B of FIG. 15. Whereas the hollow cylindrical channel is identified by the reference number 80, three brake shoes 90B are disposed on its interior. These cover, in each case, approximately a third of the interior peripheral surface of the hollow cylindrical channel 80. It is also preferred to dispose two brake shoes 90B or more than three brake shoes 90B within the hollow cylindrical channel 80. In addition, as can be seen in FIG. 15, the different brake shoes 90B have the same length. They extend accordingly over a fraction of the length of the hollow cylindrical channel 80. The length of the brake shoes 90B and thus, the available braking path must be sufficient in order to decelerate the fastening element FE fed to the hollow cylindrical channel 80, or even to bring it to a complete stop. Based on these requirements, the length of the braking path and thus the brake shoes 90B, and also of the previously described bars 90, is optimally adapted. Along with these general properties, the brake shoes 90B have the same properties as previously described above in conjunction with the bars 90.

The present invention also discloses a feed channel 70 that is not equipped with a mechanical brake arrangement for the fastening elements FE. Instead, the braking of the fastening elements FE occurs using the air, located in and backed up in the hollow cylindrical channel 80, which establishes a counteracting pressure on the movement of the fastening element FE. An embodiment of the feed channel 70 exists in that the mouth piece 70 only comprises the hollow cylindrical channel 80 (not shown).

During the setting of the fastening element FE, the open end of the feed channel 70 rests on the surface of the work piece. As a result, the open end of the feed channel 70 is closed nearly air tight. Now, when a fastening element FE moves in the hollow cylindrical channel 80, the air in the hollow cylindrical channel 80 between the fastening element FE and the open end of the feed channel 70 or of the hollow cylindrical channel 80, is compressed. The compression of the air increases with the movement of the fastening element FE in the direction of the open end of the hollow cylindrical channel 80. Thereby, the ram pressure of the compressed air in the hollow cylindrical channel 80 acting against the movement of the fastening element FE increases. This guarantees that the fastening element FE is decelerated in the feed channel 70. The deceleration can be realized to the extent that the following punch S comes in contact with the fastening element FE, thereby aligns the fastening element FE, and then joins it. Furthermore, it is preferred to generate a ram pressure in the hollow cylindrical channel 80 between fastening element FE and the component suface, such that the fastening element FE is completely stopped in the hollow cylindrical channel 80. For this purpose, it is also conceivable to use ram pressure in combination with one of the previously described mechanical braking paths for the deceleration. According to a further design, one or more compressed air channels are provided near the end of the hollow cylindrical channel 80, which border on the component. These compressed air channels are represented by way of an example in FIG. 19 with the reference number 84. It is also conceivable to run these compressed air channels 84 in the radial direction from the interior to the exterior of the hollow cylindrical channel 80. These compressed air channels 84 are equipped in this embodiment with a throttle or a throttle valve, which opens the compressed air channels 84 at a sealable ram pressure, while they were previously closed. Using this throttle, the force of the ram pressure within the hollow cylindrical channel 80 between the fastening element FE and the component surface can be set in a targeted manner. This guarantees that the fastening element can be decelerated and can even be stopped with a predefined ram pressure. In addition, the throttle guarantees that during a subsequent setting process, the ram pressure between the fastening element FE and the component surface is discharged via the compressed air channels 84, and thereby does not interfere with the setting of the fastening element FE into the component.

A further feed channel 70 of the present invention operating with counter air for decelerating the fastening element FE, is shown in the FIGS. 17 to 20. The feed channel 70 also comprises a hollow cylindrical channel 80, in which no braking bars 90 or brake shoes 90B are disposed. Instead, the feed channel 70 comprises a compressed air connector 72, which can be disposed near the first end (see FIG. 17), as well as near the second end, of the hollow cylindrical channel 80. The compressed air connector 72 connects a compressed air source (not shown) to a compressed air reservoir 74.

Air from the compressed air reservoir 74 is blown into the hollow cylindrical channel 80 via one or a plurality of compressed air channels 84. It is also preferred to connect the compressed air connector 72 directly to the compressed air channels 84.

Figure 17:
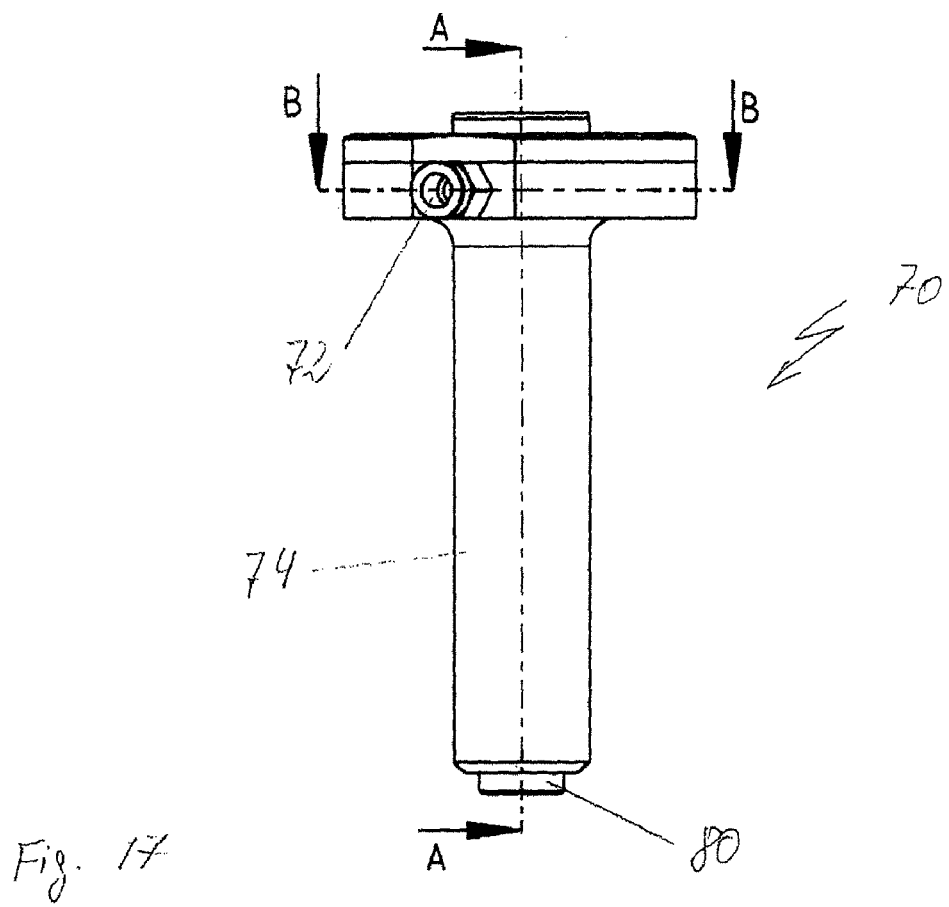
Figure 18:
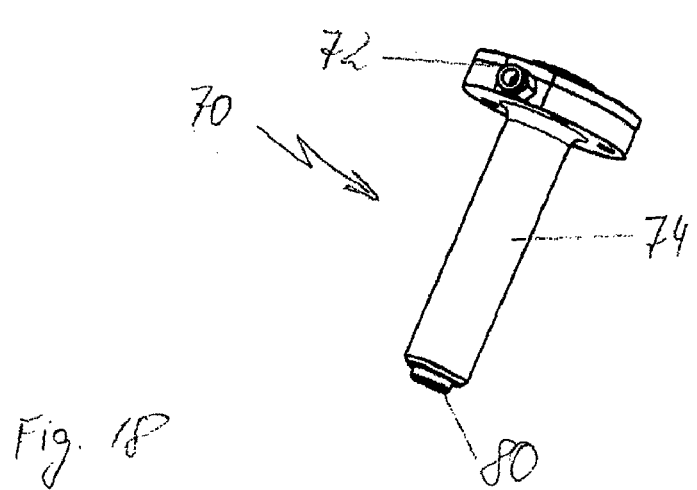
Figure 19:
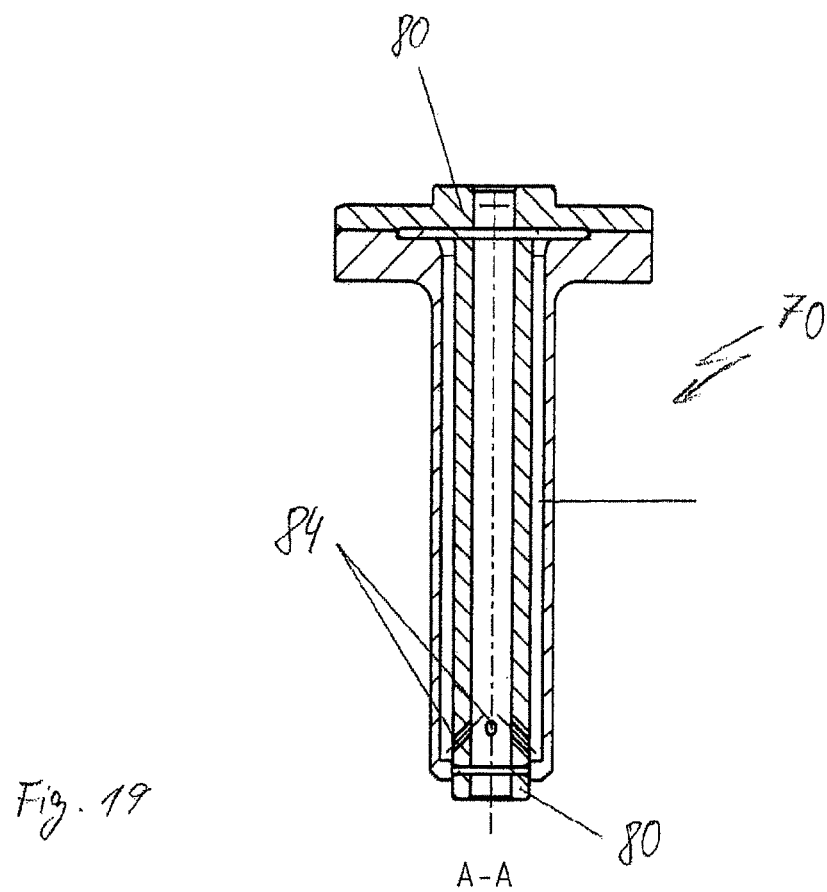
Figure 20:
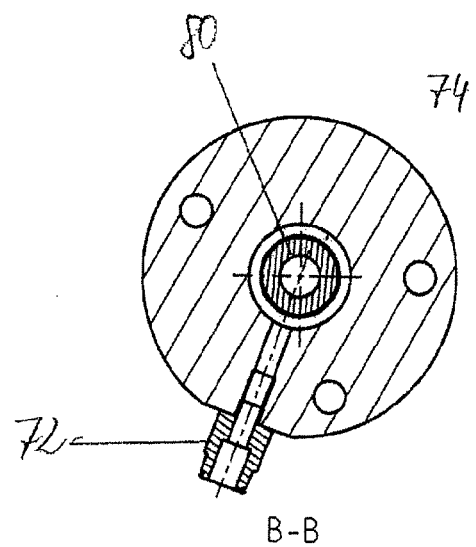

FIG. 19 shows a section through the feed channel 70 from FIG. 17 along the line A-A. The hollow cylindrical channel 80 is disposed in the center. The compressed air reservoir 74 is located in a coaxial arrangement with the hollow cylindrical channel 80. The reservoir provides storage for the compressed air bordering the hollow cylindrical channel 80. Near the second end of the feed channel 70, facing away from the setting device, the hollow cylindrical channel 80 comprises a plurality of compressed air channels 84. While one compressed air channel 84 would be sufficient, preferably several compressed air channels 84 are used. Theses compressed air channels 84 are uniformly distributed over the periphery of the hollow cylindrical channel 80. In the example of the feed channel 70 shown in FIG. 19, four compressed air channels 84 are provided.

The compressed air channels 84 run in a radial direction towards the center of the hollow cylindrical channel 80 and thereby connect the compressed air reservoir 74 to the interior of the hollow cylindrical channel 80. In addition, the compressed air channels 84 are preferably disposed slanted in the direction of the end of the hollow cylindrical channel 80 facing the setting device—the end of the hollow cylindrical channel 80 represented at the top in FIGS. 17 to 19. In this way, compressed air can be blown in counter to the movement of the fastening element FE in the feed channel 70 in the hollow cylindrical channel 80.

Through the compressed air blown into the hollow cylindrical channel 80, a counter pressure develops which counteracts the movement of the fastening element FE in the feed channel 70. As a result, the fastening element FE is decelerated, while the extent of the deceleration of the fastening element FE can be set and controlled using the amount of the air pressure. Therefore, the braking path for the fastening elements implemented with counter air can be optimally adapted to the fastening elements FE being used.

As a result, with this design, the same functionality can be implemented as with the feed channel 70 with brake bars 90 or brake shoes 90B. For further illustration of the design, FIG. 20 shows a section along the line B-B in FIG. 17. It can be recognized how the compressed air connector 72 is connected to the compressed air reservoir 74 at the end of the feed channel 70 facing the setting device.

According to a further design of the present invention, the setting device or the feed apparatus is equipped with a loading device 100. Preferred embodiments of this loading apparatus are represented in the FIGS. 7 to 13. The loading apparatus 100 works in conjunction with the carrier 10; 20 of the feed apparatus. In the further course of the description, the function and design of the loading apparatus 100 are explained in more detail using an example of their interaction with the rotary magazine 20. It is also conceivable to use the essential elements of this loading apparatus in conjunction with the strip magazine 10.

With the loading device 100, at least one fastening element FE, preferably rivets, bolts, nails can be fed individually into the retaining position 22 of the rotary magazine 20, or loaded into this. For this purpose, the loading apparatus 100 comprises a supply channel 110, via which a plurality of fastening elements FE can be supplied to the loading apparatus 100. In the FIGS. 7, and 11 to 13, the supply channel 100 is shown in an abbreviated representation. It is built, for example, by a flexible supply line in which the fastening elements FE can be fed one after another into the loading apparatus. It is also preferred to supply the fastening elements FE individually via the supply channel 110 of the loading apparatus 100. The fastening elements are accelerated, for example, with compressed air or by another suitable accelerating means in the supply channel 110 in the direction of the loading apparatus 100, in order to be individually fed further to the setting device. It is preferred to align the fastening elements FE coaxially to the longitudinal axis of the supply channel 110, in order to support a simple positioning of the fastening elements FE for the further supply to the join process. According to the embodiment represented in the FIGS. 7 to 10, the fastening elements FE, for example, nails, are fed through the supply channel 110 with the shaft forward. In the embodiment represented in the FIGS. 11 to 13, the fastening elements FE, for example, nails, are fed to the loading apparatus 100 with the head first.

The supply channel 110 feeds the plurality of fastening elements FE to a separating arrangement 120. As can be seen from the FIGS. 7 to 13, different embodiments of the separating arrangement 120 can be used. Basically, the separating arrangement 120 serves to separate at least one fastening element FE from the plurality of fastening elements FE fed via the supply channel 110, such that this fastening element can be transported individually into the retaining position 22 of the rotary magazine 20. The separating arrangement 120 functions together, along with the supply channel 110, also with a transfer arrangement 150. The transfer arrangement 150 is designed structurally in various ways, as explained below in more detail. It serves to transfer the separated fastening element FE to the rotary magazine 20, and specifically, to the retaining position 22, so that the retaining position 22 is loaded with the previously separated fastening element FE.

According to the embodiment of the loading apparatus 100 represented in the FIGS. 7 to 10, the separating arrangement 120 comprises a curvilinear progressing channel 130. This channel is directly connected to the supply channel 110, already discussed above, so that the plurality of fastening elements FE are transported in the curvilinear progressing channel 130, aligned in its longitudinal direction. This is illustrated by the fastening elements FE, of which three pieces are represented in the FIGS. 7 to 9 in the curvilinear progressing channel 130.

The curvilinear progressing channel 130 is built such that its end 135 facing the rotary magazine 20 is not coaxially aligned with its end connected to the supply channel 110. At its end 135, the curvilinear progressing channel 130 opens into a brake shoe arrangement 140. The brake shoe arrangement 140, which is shown in an enlarged representation in FIG. 10, serves for decelerating and intermediate stopping of the fastening elements FE, which are preferably fed at a high speed and frequency via the supply channel 110 and to the curvilinear progressing channel 130. The feeding occurs in this case at a speed range of 0.2 to several m/s. As soon as the first of the fed fastening elements FE has been stopped in the brake shoe arrangement 140, it is ready to be transferred individually into the rotary magazine 20.

Figure 10:
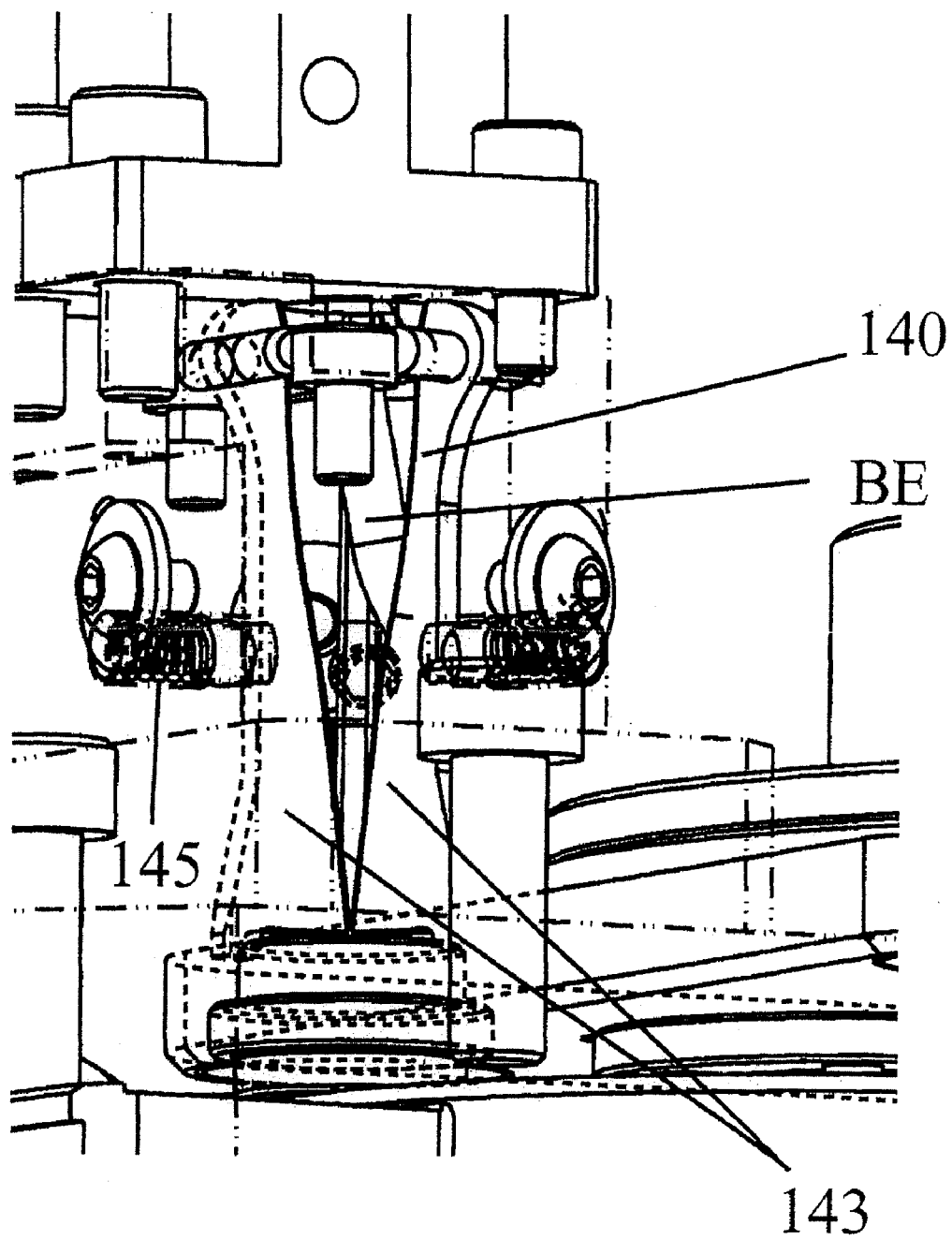

In order to be able to reliably decelerate and stop the fastening elements FE, the brake shoe arrangement 140 comprises a plurality of brake shoes 143 (see FIG. 10). These brake shoes 143 are preferably fastened on one side and are able to pivot around this point. As a result of this fastening, the brake shoes can pivot in the radial direction into the curvilinear progressing channel 130 or into its continuation, in order to suitably narrow its cross section. For this purpose, the brake shoes 143 are spring biased so that on the one hand, the incoming fastening element FE is stopped between the brake shoes 143, and on the other hand, can compress these brake shoes 143 out of the channel counter to the acting spring force, in order to be able to thereby be moved along. An exemplary arrangement for spring biasing of the brake shoes 143 is shown at the reference number 145. Thus, the brake shoes 143 constrict the feed path of the fastening elements FE in the same manner as the bars 90 of the feed channel 70. In addition, the design alternatives of the bars 90 (see above) can be used in the same manner with the brake shoes 143.

As soon as the first fastening element FE has been stopped in the brake shoe arrangement 140, and is retained as this location, the transfer arrangement 150 slides the fastening element FE out of the brake shoe arrangement 140 into the retaining position 22 of the rotary magazine 20. The transfer arrangement 150 is preferably implemented by an adjustment element that is composed, for example, of a pneumatic piston cylinder arrangement. The end of the piston of the adjustment element is represented in the FIGS. 8 and 9 with the reference number 150.

Due to the progression of the curvilinear progressing channel 130, the piston of the pneumatic piston cylinder arrangement 150 engages only through the brake shoe arrangement 140, in order to transfer the fastening element FE held there into the rotary magazine 20. Therefore, due to the shape of the curvilinear progressing channel 130, it is not necessary that the piston 150 runs through the curvilinear progressing channel 130. Along with a pneumatic piston cylinder arrangement 150, electromechanical, mechanical, electromagnetic or piezoelectric functioning designs are also conceivable as a placement element, as long as they satisfy the general requirements of the placement element 150. Thus, if the piston 150 reaches through the brake shoe arrangement 150 in order to feed the fastening element FE to the rotary magazine 20, the following fastening elements FE are blocked in the curvilinear progressing channel 130 such that they cannot be transported into the brake shoe arrangement 140. Only when the piston 150 has been withdrawn, the brake shoe arrangement 140 is released in order to be able to perform a new separating process.

Figure 11:
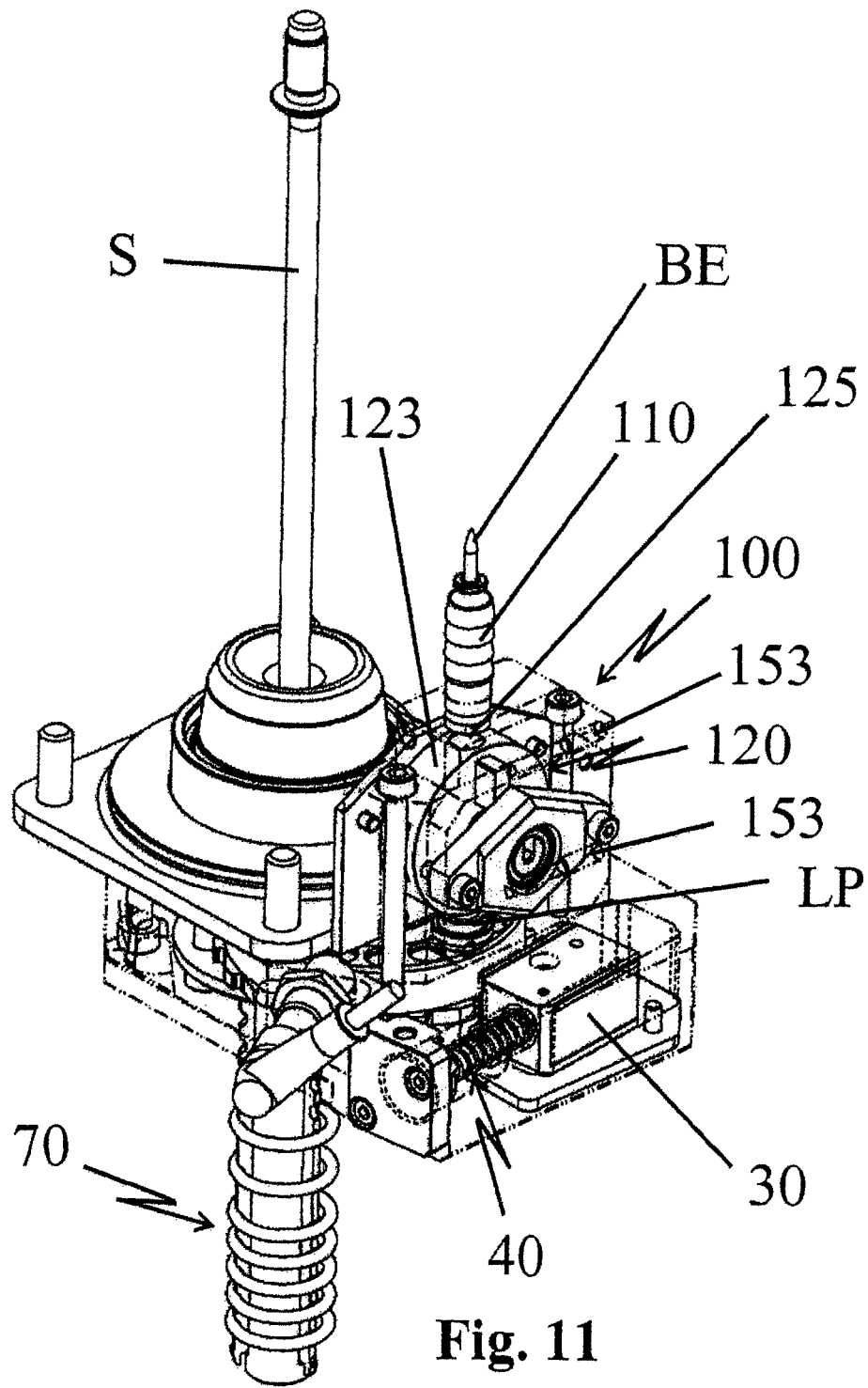
Figure 12:
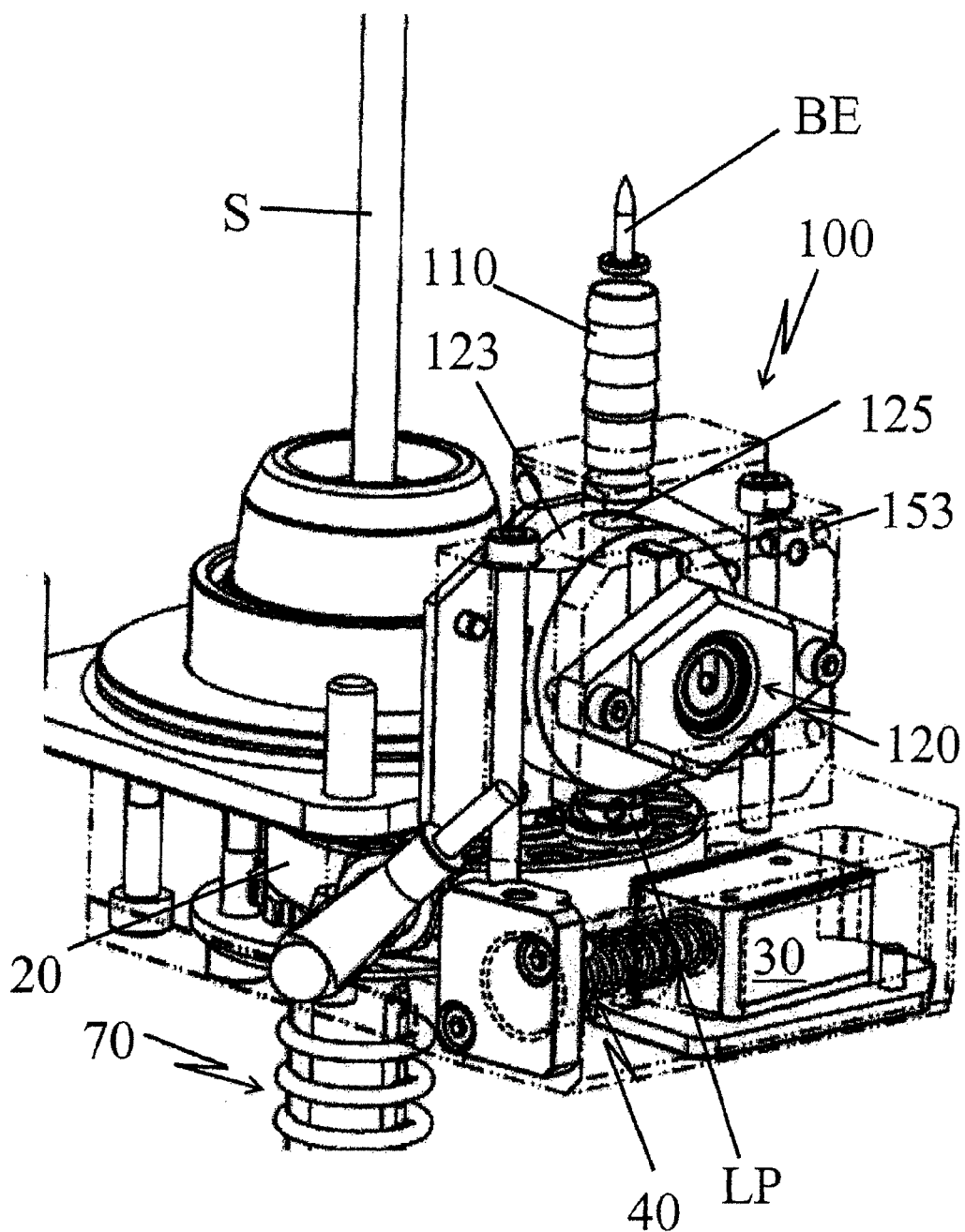
Figure 13:
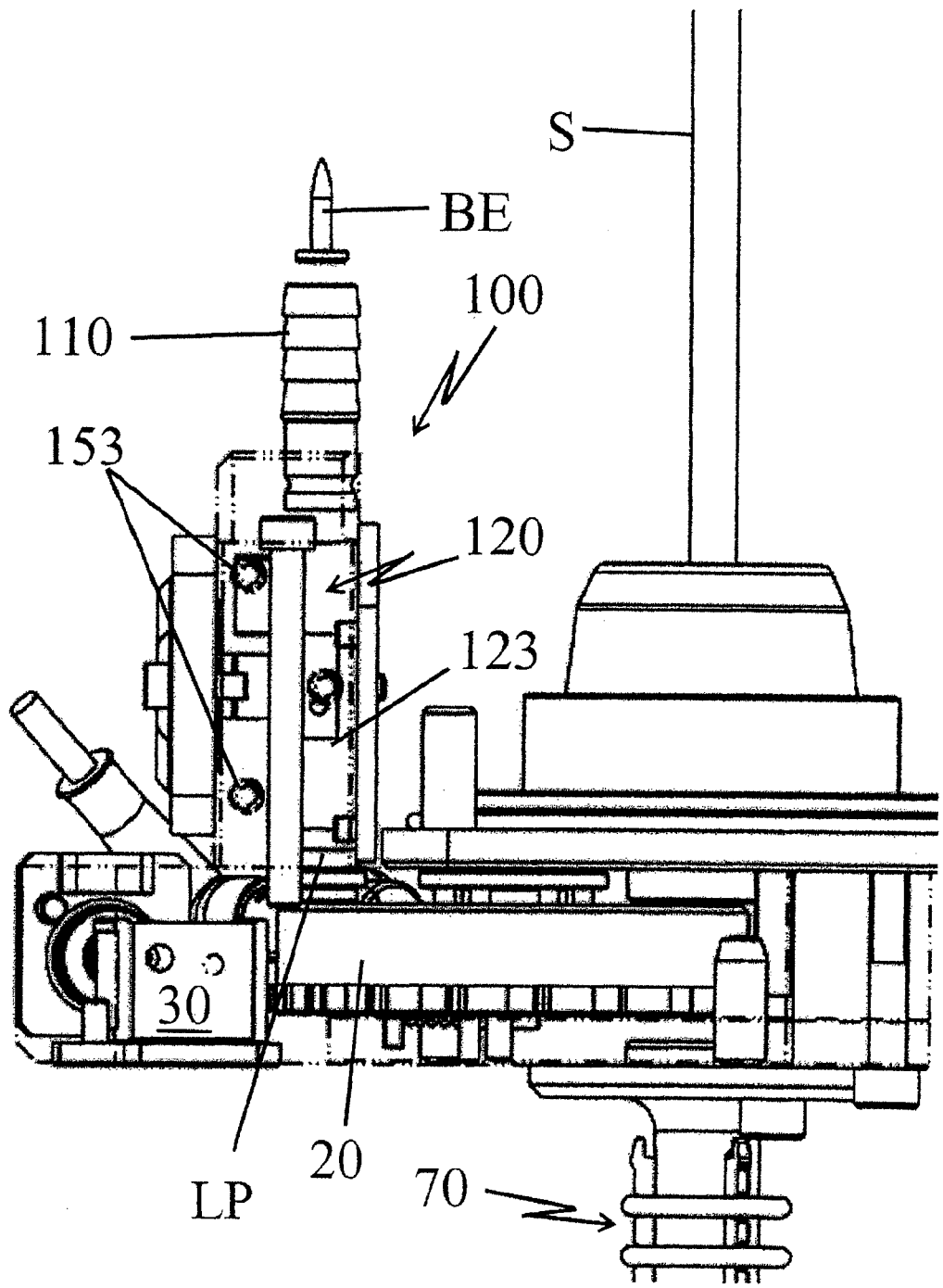

A further preferred embodiment of the loading apparatus 100 is represented in the FIGS. 11 to 13. Along with the previously described supply channel 110 (see above), the loading apparatus 100 comprises a rotatably disposed receptacle 123 as a separation arrangement 120. This rotatable receptacle 123 is equipped with at least one radially aligned chamber 125. This radially aligned chamber 125 is adapted in its dimension such that a fastening element FE can be received in a nearly coaxial alignment to the longitudinal axis of the chamber 125. The rotatable receptacle 123 comprises at least one of these radially aligned chambers 125, while two radially aligned chambers 125 located opposite from one another, or a plurality of radially aligned chambers 125 uniformly spaced along a periphery of the rotatable receptacle 123, are also conceivable.

In the FIGS. 11 to 13, the rotatable receptacle 123 is implemented as a rotatable disk. This disk comprises two radially aligned chambers 125, located opposite each other, into each of which a fastening element FE can be received. As soon as a fastening element FE arrives, via the supply channel 110, into the radially aligned chamber 125 disposed at the end of the supply channel 110, the rotatable disk or the rotatable receptacle 123 is rotated about its axis of rotation by 180°. This brings the radially aligned chamber 125 with the fastening element FE into alignment with the loading position LP of the rotary magazine 20. Through the rotation of the rotatable receptacle 123, each radially aligned chamber 125 can be disposed in front of the end of the supply channel 110, as well as, in front of the loading position LP of the rotary magazine 20. If a plurality of radially aligned chambers 125 along the periphery of the rotatable disk 123 is used, the individual radially aligned chambers 125 are brought stepwise into alignment with the loading position LP of the rotary magazine 20, in order to feed the fastening elements FE held, in each case, in the radially aligned chambers 125, at a high frequency to the rotary magazine 20.

To implement the transfer of the fastening elements FE from the rotatable receptacle 123 into the rotary magazine 20, the respective fastening element FE is moved by means of compressed air, mechanical, electromechanical, electromagnetic and/or piezoelectric means into the retaining position 22 of the rotary magazine 20. In the embodiment represented here, it is preferred to connect a compressed air channel 153 to the radially aligned chamber 125, where the compressed air channel 153 in turn is connected to a compressed air source (not shown). As soon as the radially aligned chamber 125 is aligned with the loading position LP, the compressed air source generates a compressed air pulse, via the compressed air channel 153, onto the fastening element FE contained in the chamber 125, so that it is moved into the retaining position 22 of the rotary magazine 20. By using compressed air or another means of acceleration on the fastening element FE, it is guaranteed that the fastening element FE need not be transferred by means of gravitational force. In addition, it is attained by this means of acceleration that the fastening elements FE are transferred in the shortest time possible into the rotary magazine 20.

Thus, according to the invention, it is preferred to provide a setting device that has a feed apparatus 1 and/or a feed channel 70 and/or a loading apparatus 100, as previously described. In addition, the present invention further discloses a setting device, in which a storage magazine (not shown) is disposed above the rotary magazine 20, and where in this storage magazine a plurality of fastening elements can be received and from which the fastening elements can be dispensed into the rotary magazine. A preferred construction of the storage magazine is built in its shape like the previously described rotary magazine 20, with the difference that the storage magazine is built longer than the rotary magazine 20. Therefore, the possibility exists to receive multiple fastening elements FE disposed one after the other in the retaining positions of the storage magazine parallel to the longitudinal axis of the storage magazine. The storage magazine is disposed within the setting device above the rotary magazine in such way that a single fastening element FE can be transferred from at least one retaining position of the storage magazine into at least one retaining position 22 of the rotary magazine. This transfer of the fastening elements FE can occur by means of gravitational force, as well as, by using compressed air, mechanical, electromechanical, electromagnetic and/or piezoelectric means. Therefore, the axes of rotation of the storage magazine and the rotary magazine 20 are preferably aligned parallel to each other.

Figure 21:
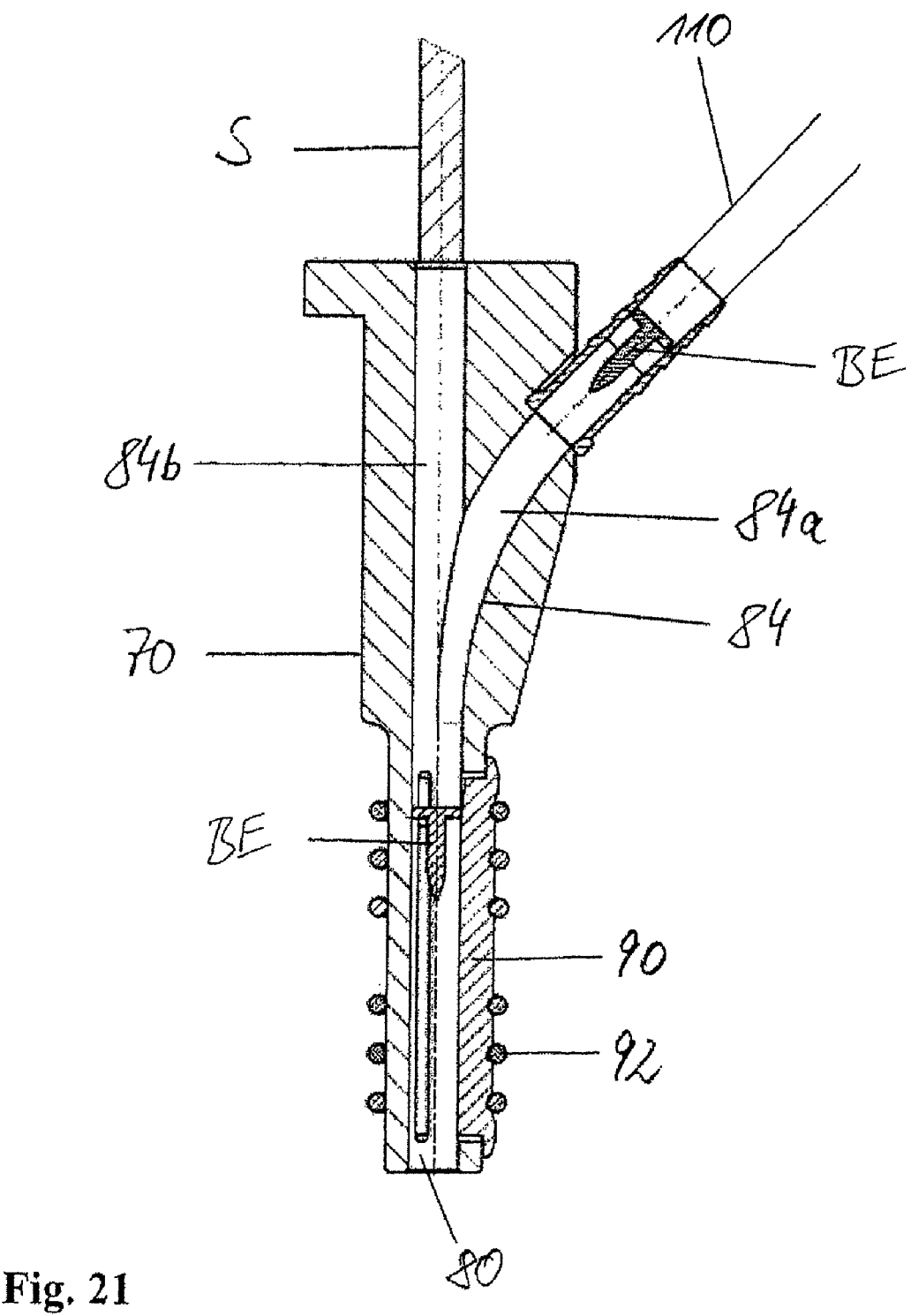

The present invention discloses a further loading apparatus, which is represented as an example in FIG. 21. In contrast to the embodiment of FIG. 7, here the supply channel 110 is connected, or can be connected, to the feed channel 70 without intermediately disposed carrier or magazine arrangement. In addition, the loading apparatus described in the following can be combined for each feed channel 70 with a counter air braking path or a mechanical braking path, although in FIG. 21 as an example, only a feed channel 70 with brake bars 90 is represented.

Via the supply channel 110, fastening elements FE can be fed individually to the hollow cylindrical channel 80 of the feed channel 70. The fastening elements FE are already disposed in the correct positional orientation in the supply channel 110, i.e., aligned in the way which they are next to be joined by the punch S of the setting device.

According to a first alternative, the supply channel 110 is permanently connected to the feed channel 70, and opens directly into the hollow cylindrical channel 80 (see FIG. 21). According to a second alternative (not shown), the feed channel 70 and the supply channel 110 are only temporarily connected together for feeding a fastening element FE.

For implementing the first alternative, the feed channel 70 comprises a Y-shaped branching 84 of the hollow cylindrical channel 80. Via the first branch 84a of the Y-shaped branching 84, the supply channel 110 is continuously connected to the hollow cylindrical channel 80, and therefore, to the braking path. The punch S joins the fastening element FE located in the feed channel 70 through the second branch 84b of the Y-shaped branching 84. Therefore, the fastening element FE can be moved via the supply channel 110 and the first branch 84a of the Y-shaped branching 84 directly into the feed channel 70 into a position suitable for setting. As soon as the fastening element FE reaches the feed channel 70, it is decelerated in the braking path, for example, mechanically or with compressed air. The deceleration in the braking path is adjusted to the movement of the following punch S so that the fastening element FE can be supplied individually controlled, and then set.

In the second alternative of the loading apparatus (see FIG. 22, 23), a feed channel 70 with braking path is used without the Y-shaped branching. However, the loading apparatus has, as is represented in FIG. 22, 23, the hollow cylindrical channel 80 and a connection to the supply channel 110. In order to be able to produce a temporary connection between the supply channel 110 and the feed channel 70, the feed channel 70 is preferably pivoted about a point of rotation 86.

The pivot movement moves the end of the feed channel 70 facing the setting device, or the end of the hollow cylindrical channel 80 facing the setting device, between a first position P1 and a second position P2. In the first position P1, the hollow cylindrical channel 80 is aligned to the punch S so that the punch S can move into the hollow cylindrical channel 80 for joining. After the feed channel 70 has been pivoted about the point of rotation 86 along the curved line 88 (see FIG. 22), the end of the hollow cylindrical channel 80 facing the setting device is in the second position P2. In the second position P2, the hollow cylindrical channel 80 is aligned with the supply channel 110 so that a fastening element FE can be fed. As soon as the fastening element FE has been fed into the hollow cylindrical channel 80 at the second position P2, the fastening element FE moves in the direction of the braking path 90, 92.

It is stopped there. At the same time or after this movement of the fastening element FE, the hollow cylindrical channel 80 pivots about the point of rotation 86 into the first position P1, in which the hollow cylindrical channel 80 is aligned with the punch S (see FIG. 23). After triggering or start of a setting process, the punch S now moves through the hollow cylindrical channel 80 and sets the fastening element FE out of the braking path, or in general, out of the hollow cylindrical channel 80, into the component (not shown).

It is also preferred to shift the feed channel 70 between the first position P1 and the second position P2, thus, between a possible setting movement of the punch S and a possible feed of a fastening element FE into the feed channel 70, for example, by means of a straight line movement. For this purpose, the supply channel 110 is aligned such that it opens in a straight line into the hollow cylindrical channel 80, as soon as the feed channel 70 has reached the second position. According to a further embodiment, the feed channel 70 is moved between the first and second position by a combined rotational and translational movement.

The present invention also discloses a method for joining fastening elements FE, in particular, rivets, bolts, nails and similar, using a setting device. For this purpose, the setting devices previously described are suitable, for example. The setting devices, according to a preferred embodiment, are moved using a robot so that they can be used industrially, and can generate an appropriately high number of join locations per unit of time. According to a first embodiment, the robot places the setting device, or generally, the setting device is advanced into contact with one of the components to be connected. If the components to be connected to not have the desired dimensional stability, they are preloaded by the forward movement and contact of the setting device. This also covers the case that gaps, distances at the join location between the components to be joined are reduced or eliminated by the contact of the setting device. In this way, the components are brought into contact in the join zone. Thus, the setting device presses against one of the components to be joined without an extra movable hold-down device of the setting device preloading the components against each other. This defined and elastic advance movement, and thereby, the preloading of the components to be connected using the setting device are implemented, for example, using a pneumatic cylinder on the robot of the setting device, where the cylinder is disposed, for example, with a robot engaging laterally at the setting device, between the setting device and the robot. With this pneumatic cylinder, a maximum pressing load of the components to be connected by the setting device can be adjusted so that the components to be connected are not deformed by the engaging setting device. It is also conceivable in the case of exceeding the pressing load that the pneumatic cylinder yields in order to avoid damaging components or the setting device. Supplementing this, the pneumatic cylinder or in general, the hold-down arrangement, is equipped such that it damps reaction forces of the setting device, if they are supercritical. Reaction forces are, for example, the recoil of the setting device during the setting processes. A damping of these reaction forces protects both the setting device as well as the robot from damage. Therefore, the targeted advance movement of the setting device brings the setting device into the desired position for inserting the fastening element FE, and simultaneously preloads the components to be connected without requiring additional constructions. In this context, it must also be noted that after the contact of the setting device with one of the components to be connected the setting device fulfills a hold-down function during the subsequent join process. In this way, deformations particularly of the upper component in the join zone are avoided. For this purpose, the end of the setting device contacting the component consists, for example, of a pipe end, for example, the feed channel 70. Preferably, the pipe end is covered with plastic in order to achieve a damping effect and/or protective effect. It is also preferred to provide a spring loaded sleeve at or near the contact end of the setting device. Due to a fixed or adjustable spring force of the spring loaded sleeve in the direction of the component and/or in the direction of the setting device along the axis of translation of the punch of the setting device, the advance movement of the setting device can be performed precisely and reliably without leading to damage of the component or the setting device.

It is also conceivable to implement the elastic advance movement of the setting device not with a separate pneumatic cylinder, but rather, using the robot already mentioned above. This function could be performed directly by the robot, as long as a spring preloaded elastic construction is implemented as a hold-down arrangement between the robot and the setting device. This spring preloaded elastic construction compensates axial component tolerances similarly to a compensation slide during punch riveting. In this way, the active seventh axis of the robot, i.e. the previously discussed additional pneumatic cylinder can be omitted, and instead, the passive spring preloaded elastic construction can be used maintenance-free. However, depending on the angular position of the robot and setting device and the join direction, i.e., upwards, downward, or in the horizontal direction, the mass of the setting device acts on the flange or the join location (joining downwards) or away from the flange (overhead join). For this reason, it is further preferred to design the spring preloaded elastic construction sufficiently strong and adapted to the expected loads from the mass of the setting device. This construction support an angular independent joining which can be implemented using a double spring solution with two preloaded springs disposed in succession.

After the advanced movement, the fastening element FE is inserted into the components to be connected by the setting device.

Independent of the selection of the different method alternatives, it is preferred that the fastening element FE is decelerated using a braking path in the feed channel before the setting by the punch P. The deceleration in the braking path guarantees that the following punch S comes in contact with the fastening element FE, and thereby, aligns the fastening element FE before setting it into the component. Therefore according to a first alternative, as a further method step, a deceleration of the fastening element FE to be inserted occurs within a feed channel 70 by means of friction between the fastening element FE and a braking path of the feed channel 70. Because the braking is based on friction, for example, braking bars 90 or brake shoes 90*b* are used. According to a further alternative, the deceleration occurs by means of counter air using the previously described feed channels 70. If the counter air is blown in, this deceleration for the method can be implemented both with, and without, contact with the component. If the deceleration occurs solely by ram pressure without blown in counter air, it is necessary that the feed channel contacts the component before setting the fastening element, and thereby, closes the open end of the feed channel nearly air tight. Therefore with this alternative, the method has the further step: deceleration of the fastening element FE, to be inserted, within the feed channel 70 by means of counter air, wherein pressurized air is blown into the feed channel 70 counter to the setting movement of the fastening element, or wherein due to the contact of the setting device at the component a ram pressure is generated in the feed channel 70 between the fastening element FE and component.

According to a further design of the above joining method, the setting device is advanced separately to each individual join location so that the hold-down device of the setting device, which cannot be moved independently, contacts one of the components to be joined and preloads them. After inserting the fastening element FE, the setting device is raised again from the join location and moved to the next join location. Thus, an interruption of the movement over several join locations occurs at each individual join location in order to insert the respective fastening element FE.

It is also preferred to move the setting device over a plurality of join locations while the hold-down device is in contact with one of the components to be connected, and preloads them. During this continual movement of the setting device over the plurality of join locations, a fastening element FE is inserted in each case at the individual join locations, without having to interrupt the movement of the setting device. This has the advantage that in comparison to a movement that is interrupted at each join location, a greater number of join locations can be processed in the same unit of time. In order to implement this method optimally it is preferred, for example, to use a hold-down device of the setting device with a roller presser (not shown). This hold-down device built in the form of a roller presser also contacts one of the components to be connected, and preloads the components to be connected against each other. While this preloading continues, the roller presser is in a position to roll on the surface of the one of the components to be connected, and doing so, to maintain the preload. Using this rolling movement of the hold-down device and the maintenance of the preload on the components to be connected, the plurality of join locations can be reached without interrupting the movement, while a fastening element FE can be inserted at each join location.

In order to facilitate the setting of fastening elements FE, the roller presser (not shown) is preferably equipped with a trigger function. This trigger function comprises that depending on the rolling movement of the roller presser on the component, a trigger signal is generated that starts a setting process of a fastening element. Thus, through the amount of the circumference travelled by the roller presser, the distance between adjacent fastening elements FE to be set can be defined. In addition, the roller presser takes on the triggering of the setting process so that this no longer needs to be performed individually by the robot or user. For this reason, the robot and/or user must now specify only the travel path of the setting device along which the setting device moves, and along which the fastening elements FE should be set. The roller presser guarantees in this manner a semi-automatic setting of fastening elements FE wherein the hold-down function must be implemented only optimally with the roller presser.

In order to implement the trigger function described above, the roller presser comprises a rotatably mounted wheel, which can be fasted to the setting device by an arrangement. This arrangement and with it the rotatably fastened wheel are attached to the setting device in such a way that the wheel rolls on the surface of the component during a movement of the setting device. In addition, the roller presser includes a trigger arrangement in connection with the wheel, where said trigger arrangement, depending on the rotation of the wheel and/or the partial rotation of the wheel, generates a signal, with which a setting process of the setting device can be initiated on the component at locations of the component distanced from each other by rolling of the setting device, where the distance between these locations is given by the rolling distance of the wheel. Thus, the roller presser represents a trigger aid, which guarantees, for example, an equidistant setting of fastening elements FE into the components to be joined. With the wheel of the roller presser, a switch can be actuated depending on the rotation or the partial rotation of the wheel, in order to generate a signal in the trigger arrangement for starting a setting process of the setting device.

The switch, and with it in general the trigger arrangement, is preferably designed mechanically or electrically. For the mechanical trigger arrangement, the wheel comprises one or a plurality of projections, with which a switch can be actuated depending on the rotation of the wheel. The projections are disposed adjustably in their position relative to the periphery of the wheel. A further alternative consists in that the wheel of the roller presser can be exchanged, and therefore, wheels with different arrangements of projections can be used in the roller presser. Thus, the projection or projections on the wheel actuate the switch of the trigger arrangement depending on a complete or partial rotation of the wheel. Thereby, a trigger signal is generated in the trigger arrangement or by the trigger arrangement. This trigger signal is sent onward to the setting device, and starts or initiates the next setting process of a fastening element FE.

With the electronic trigger arrangement, the wheel is equipped with a photoelectric barrier, an electrical or magnetic pulse generator, or generally, with one or several electrical switches. Depending on the complete or partial rotation of the wheel, these electrical switches are actuated and a trigger signal is generated. This trigger signal is in turn sent onward to the setting device, and starts or initiates the next setting process of a fastening element FE.

Therefore, the roller presser is preferably used in combination with a setting device in order to implement the hold-down function and/or the trigger function. Thus, it serves also as a trigger support when the setting device is not to engage at the work piece. Therefore, a method for setting fastening elements using a setting device with roller presser can be supplemented by the following steps: contacting and rolling of a roller presser on the component with or without the preloading of the components, and in conjunction with a movement of the setting device, and generating a signal with the roller presser depending on the rotation of the roller presser, that in each case initiates a setting process such that the rotation of the roller presser specifies the join location.

According to a further method alternative of the present invention, fastening elements FE are joined with the following method steps. The components to be connected are preloaded, not with the setting device or with a separate movable hold-down device, but rather with a preloading construction independent of the setting device. Subsequently the setting device is advanced to the components to be connected. This advancement occurs preferably using a robot, in order to be able to attain, for example, the number of join locations according to a production path in vehicle manufacturing. The advancement of the setting device in the direction of the components to be connected occurs only so far, so that the setting device is not contacting one of the components to be connected. Thus, a gap is set between the components to be connected and the setting device, across which a reliable join of the components to be connected is still guaranteed. After the advancement process of the setting device is completed, a fastening element FE is inserted at the respective join location. With this method it is possible to move the setting device over a plurality of join locations without a hold-down device of the setting device contacting and preloading the components to be connected. Therefore, it is also guaranteed that a plurality of join locations can be reached or processed with high speed in comparison to the state of the art. In addition, this method procedure guarantees that the insertion of the fastening elements at the plurality of join location can be implemented with or without interrupting the movement of the setting device at the individual join locations. Thus, this method too leads to an increase of the efficiency of joins of fastening elements.

According to a preferred embodiment, the setting device is led using a robot at approximately 4 mm above the flange fixed by clamping technology, and in the process sets the respective fastening element.

Therefore, the present invention delivers a plurality of components of a setting device, as previously described. These components can be combined in arbitrary ways to form a setting device such that the individual method steps of the setting method result from this combination. These vary, for example, with the loading arrangement used, or the use of the roller presser.

The invention claimed is:

1. A feed apparatus for feeding fastening elements held in a carrier to a setting device, where the carrier has uniformly spaced retaining positions for the fastening elements, the feed apparatus comprising:
   a. a housing with a slide adapted to be moved linearly using a pneumatically operated piston cylinder drive into one of an advance position and a home position, where the slide in the advance position is spring biased in the direction of the home position, so that the slide can be moved into the home position by the spring bias, and the carrier can be moved by an amount substantially equal to one of the uniformly spaced retaining positions;
   b. an advance arm including a first end and a second end, the first end being pivotably fastened to the slide, and the second end engaging the carrier such that movement of the slide can be transferred to the carrier, whereby one of the fastening elements can be positioned into a feed position beneath a punch of the setting device; and
   c. a blocking arm that is pivotally fastened to the housing and engages the carrier wherein a movement of the carrier is substantially prevented during the movement of the slide from the home position to the advance position,
   wherein the carrier is selected from the group consisting essentially of:
     (1) a strip magazine having opposing longitudinal sides and a strip barb shaped structure at each of the longitudinal sides, wherein the advance arm hooks into one of the strip barb shaped structures and the blocking arm hooks into another of the strip barb shaped structures, and
     (2) a ring shaped rotary magazine having a peripheral outer surface and a peripheral inner surface, and a first ring barb shaped structure at the peripheral outer surface, in which the advance arm hooks, and a second ring barb shaped structure at the peripheral inner surface, in which the blocking arm hooks.

2. The feed apparatus according to claim 1, wherein the pneumatically operated piston cylinder drive is synchronized, and adapted to be operated independently of a movement of the punch of the setting device.

3. The feed apparatus according to claim 1, further comprising a blocking means being one of the punch of the setting device or a second blocking arm pivotally coupled to the slide.

4. The feed apparatus according to claim 1, wherein the strip magazine includes retaining positions disposed in a row, and wherein the ring shaped rotary magazine includes retaining positions disposed in the periphery of the rotary magazine.

5. The feed apparatus according to claim 4, wherein the strip magazine includes the barb shaped structure on a longitudinal side of the strip magazine such wherein the strip magazine can be moved only in one direction by the advance arm.

6. The feed apparatus according to claim 4, further comprising a guideway adapted to laterally guide the strip magazine.

7. The feed apparatus according to claim 4, further comprising a chamber disposed at the retaining positions of the ring shaped rotary magazine, wherein the retaining positions are adapted to receive one of the fastening elements.

8. The feed apparatus according to claim 7, wherein the rotary magazine is disposed on a plate adapted to close the chamber, wherein the plate includes an opening on a feed position through which the fastening elements can be discharged from the chamber.

9. The feed apparatus according to claim 8, wherein the opening is connected to a feed channel of the setting device, and the punch of the setting device is adapted to move through the opening at the feed position to join the fastening element.

10. The feed apparatus according to claim 7, wherein the rotary magazine is covered with a cover plate wherein the chamber is closed by the cover plate on a top side of the rotary magazine, and wherein the cover plate has an opening through which the fastening elements can be fed into the chamber.

11. The feed apparatus according to claim 4, wherein the rotary magazine includes a peripheral outer surface which has a barb shaped structure so that the rotary magazine can be moved in one direction using the advance arm.

12. The feed apparatus according to claim 4, wherein the peripheral inner surface includes the blocking means to substantially prevent a movement of the rotary magazine in one direction.

13. A setting device adapted to insert a fastening element at a joint location, and comprising:
   a carrier for holding the fastening element and having uniformly spaced retaining positions for the fastening element;
   a feed apparatus adapted to feed the fastening element to the setting device, the feed apparatus including:
      a. a housing with a slide adapted to be moved linearly using a pneumatically operated piston cylinder drive into one of an advance position and a home position, where the slide in the advance position is spring biased in the direction of the home position, wherein the slide can be moved into the home position by a spring bias, and the carrier can be moved by an amount substantially equal to one of the uniformly spaced retaining positions;
      b. an advance arm including a first end and a second end, the first end being pivotally fastened to the slide, and the second end engaging the carrier wherein the movement of the slide can be transferred to the carrier, whereby one of the fastening elements can be positioned into a feed position beneath a punch of the setting device; and
      c. a blocking arm that is pivotally fastened to the housing and engages the carrier wherein a movement of the carrier is substantially prevented during the movement of the slide from the home position into the advance position,
   wherein the carrier is selected from the group consisting essentially of:
      (1) a strip magazine having opposing longitudinal sides and a strip barb shaped structure at each of the opposing longitudinal sides, wherein the advance arm hooks into one of the strip barb shaped structures and the blocking arm hooks into another of the strip barb shaped structures, and
      (2) a ring shaped rotary magazine having a peripheral outer surface and a peripheral inner surface, and a first ring barb shaped structure at the peripheral outer surface, in which the advance arm hooks, and having a second ring barb shaped structure at the peripheral inner surface, in which the blocking arm hooks.

14. The setting device according to claim 13, further comprising a hold-down arrangement disposed between an arrangement supporting the setting device and the setting device, the hold-down arrangement adapted to implement a hold-down function of the setting device and to dampen reaction forces of the setting device directed at the supporting arrangement when the fastening elements are set.

15. The setting device according to claim 14, wherein the hold-down arrangement functions based on a member selected from a group consisting essentially of a pneumatic element and a force controlled placement of the setting device on a work piece.

16. A method for feeding fastening elements into a setting device comprising:
   a. obtaining the setting device according to claim 13;
   b. loading a first fastening element at a loading position into a carrier;
   c. simultaneously unloading a second fastening element at a feed position into a feed channel of the setting device, the second fastening element being joined in the feed channel.

17. A method for joining fastening elements with a setting device according to claim 13, the method comprising:
   a. advancing the setting device into contact with one of components to be connected so that the components to be connected are preloaded against each other without separately moving a hold-down device; and
   b. inserting the fastening element into the components to be connected.

18. The method according to claim 17, wherein the advancing is performed by moving the setting device using a robot, until the setting device contacts one of the components to be connected and preloads the component to be connected using a hold-down device.

19. The method according to claim 17, further comprising interrupting a travel movement between multiple join locations at each join location in order to insert the fastening element.

20. The method according to claim 17, further comprising:
   moving the setting device over a plurality of join locations where the hold-down device is in contact with one of the components to be connected, and preloads the components to be connected; and inserting the fastening element at the join locations, without interrupting the movement of the setting device at the join locations.

21. A method for joining fastening elements with the setting device according to claim 13, the method comprising:
   a. preloading a plurality of components to be connected with a preloading construction independent of the setting device;
   b. advancing the setting device to the components to be connected without the setting device contacting one of the components to be connected; and
   c. inserting the fastening element into the components to be connected.

22. The method according to claim 21 further comprising:
   moving the setting device over a plurality of join locations without a hold-down device of the setting device preloading the components to be connected; and
   inserting the fastening elements at the plurality of join locations.

* * * * *